US006904823B2

(12) United States Patent
Levin et al.

(10) Patent No.: US 6,904,823 B2
(45) Date of Patent: Jun. 14, 2005

(54) HAPTIC SHIFTING DEVICES

(75) Inventors: Michael D. Levin, Sunnyvale, CA (US); Steven P. Vassallo, Redwood City, CA (US)

(73) Assignee: Immersion Corporation, San Jose, CA (US)

( * ) Notice: Subject to any disclaimer, the term of this patent is extended or adjusted under 35 U.S.C. 154(b) by 33 days.

(21) Appl. No.: 10/116,237

(22) Filed: Apr. 3, 2002

(65) Prior Publication Data

US 2003/0188594 A1 Oct. 9, 2003

(51) Int. Cl.[7] ............................................... F16H 15/00
(52) U.S. Cl. .............................. 74/471 XY; 74/473.12; 200/61.88
(58) Field of Search ...................... 74/473.12, 473.1, 74/335, 471 XY; 200/61.88

(56) References Cited

U.S. PATENT DOCUMENTS

| 3,157,853 A | 11/1964 | Hirsch |
| 3,220,121 A | 11/1965 | Cutler |
| 3,497,668 A | 2/1970 | Hirsch |
| 3,517,446 A | 6/1970 | Corlyon et al. |
| 3,902,687 A | 9/1975 | Hightower |
| 3,903,614 A | 9/1975 | Diamond et al. |

(Continued)

FOREIGN PATENT DOCUMENTS

| EP | 0 085 518 A1 | 8/1983 |
| EP | 0349086 | 1/1990 |
| JP | S61-83533 | 5/1986 |
| JP | 01-003664 | 7/1990 |
| JP | H2-209925 | 8/1990 |
| JP | H3-66990 | 8/1991 |

(Continued)

OTHER PUBLICATIONS

B. Adelstein et al., "Design and Implementation of a Force Reflecting Manipulandum for Manual Control Research," pp. 25, (1992).

M. Russo, "The Design and Implementation of a Three Degree of Freedom Force Output Joystick," Massachusetts Institute of Technology, pp. 131, (May 1990).

B. Schmult et al., "Application Areas for A Force–Feedback Joystick," DSC vol. 49. Advances in Robotics, Mechatronics, and Haptic Interfaces, ASME, pp. 47–54, (1993).

L. Rosenberg et al., "Commercially Viable Force Feedback Controller for Individuals with Neuromotor Disabilities," United States Air Force Armstrong Laboratory, pp. 38, (May 1996).

F. Brooks Jr., et al. "Project GROPE—Haptic Displays for Scientific Visualization," Computer Graphic vol. 24, No. 4, pp. 177–185, (Aug. 1990).

Web Page, "Meritor Launches Shift–By–Wire Transmissions," at URL=http://www.heavydutytrucking.com/1998/05/138a9805.asp, pp. 3, printed May 1, 2001.

(Continued)

*Primary Examiner*—David Fenstermacher
(74) *Attorney, Agent, or Firm*—Kilpatrick Stockton LLP

(57) ABSTRACT

A haptic shift device for use in shift-by-wire systems in vehicles. The haptic shift device includes a shift lever manipulatable by a user. At least one sensor detects a position of the shift lever, and a transmission gear of the vehicle is caused to be changed based on the position of the shift lever. At least one electrically-controlled actuator outputs a force on the shift lever. In some embodiments, the shift lever is moveable within a pattern and is blocked from areas outside the boundaries of the pattern. The actuator(s) can be active or passive, and/or a variable mechanical gate can be used to implement the pattern. Provided shifting modes can include automatic, manual, and/or sequential modes. Other shifting modes can also be provided.

40 Claims, 9 Drawing Sheets

U.S. PATENT DOCUMENTS

| | | |
|---|---|---|
| 3,919,691 A | 11/1975 | Noll |
| 4,160,508 A | 7/1979 | Salsbury, Jr. |
| 4,227,319 A | 10/1980 | Guy et al. |
| 4,236,325 A | 12/1980 | Hall et al. |
| 4,398,889 A | 8/1983 | Lam et al. |
| 4,403,756 A | 9/1983 | Berlin et al. |
| 4,477,043 A | 10/1984 | Repperger |
| 4,513,235 A | 4/1985 | Acklam et al. |
| 4,531,080 A | 7/1985 | Nordström et al. |
| 4,581,491 A | 4/1986 | Boothroyd |
| 4,599,070 A | 7/1986 | Hladky et al. |
| 4,676,115 A | 6/1987 | Morscheck et al. |
| 4,708,656 A | 11/1987 | de Vries et al. |
| 4,713,007 A | 12/1987 | Alban |
| 4,800,721 A | 1/1989 | Cemenska et al. |
| 4,891,764 A | 1/1990 | McIntosh |
| 4,912,997 A | 4/1990 | Malcolm et al. |
| 4,930,770 A | 6/1990 | Baker |
| 4,934,694 A | 6/1990 | McIntosh |
| 4,949,119 A | 8/1990 | Moncrief et al. |
| 4,982,918 A | 1/1991 | Kaye |
| 5,019,761 A | 5/1991 | Kraft |
| 5,022,407 A | 6/1991 | Horch et al. |
| 5,035,242 A | 7/1991 | Franklin |
| 5,038,089 A | 8/1991 | Szakaly |
| 5,044,956 A | 9/1991 | Behensky et al. |
| 5,076,517 A | 12/1991 | Ferranti et al. |
| 5,078,152 A | 1/1992 | Bond |
| 5,107,080 A | 4/1992 | Rosen |
| 5,116,051 A | 5/1992 | Moncrief et al. |
| 5,142,931 A | 9/1992 | Menahem |
| 5,146,566 A | 9/1992 | Hollis, Jr. et al. |
| 5,186,695 A | 2/1993 | Mangseth et al. |
| 5,197,003 A | 3/1993 | Moncrief et al. |
| 5,212,473 A | 5/1993 | Louis |
| 5,223,776 A | 6/1993 | Radke et al. |
| 5,240,417 A | 8/1993 | Smithson et al. |
| 5,271,290 A | 12/1993 | Fischer |
| 5,275,174 A | 1/1994 | Cook |
| 5,275,565 A | 1/1994 | Moncrief |
| 5,299,810 A | 4/1994 | Pierce |
| 5,309,140 A | 5/1994 | Everett |
| 5,334,027 A | 8/1994 | Wherlock |
| 5,366,376 A | 11/1994 | Copperman et al. |
| 5,368,484 A | 11/1994 | Copperman et al. |
| 5,396,266 A | 3/1995 | Brimhall |
| 5,399,091 A | 3/1995 | Mitsumoto |
| 5,466,213 A | 11/1995 | Hogan |
| 5,473,235 A | 12/1995 | Lance et al. |
| 5,513,100 A | 4/1996 | Parker et al. |
| 5,547,382 A | 8/1996 | Yamasaki |
| 5,587,937 A | 12/1996 | Massie et al. |
| 5,589,828 A | 12/1996 | Armstrong |
| 5,589,854 A | 12/1996 | Tsai |
| 5,591,082 A | 1/1997 | Jensen et al. |
| 5,629,594 A | 5/1997 | Jacobus et al. |
| 5,634,794 A | 6/1997 | Hildreth et al. |
| 5,643,087 A | 7/1997 | Marcus et al. |
| 5,691,898 A * | 11/1997 | Rosenberg et al. ........... 700/85 |
| 5,734,373 A | 3/1998 | Rosenberg et al. |
| 5,742,278 A | 4/1998 | Chen et al. |
| 5,766,016 A | 6/1998 | Sinclair |
| 5,767,839 A | 6/1998 | Rosenberg |
| 5,785,630 A | 7/1998 | Bobick et al. |
| 5,823,876 A | 10/1998 | Unbehand |
| 5,889,672 A | 3/1999 | Schuler et al. |
| 5,929,607 A * | 7/1999 | Rosenberg et al. ......... 320/166 |
| 5,984,828 A | 11/1999 | Huber |
| 6,004,134 A | 12/1999 | Marcus et al. |
| 6,056,669 A | 5/2000 | Marshall |
| 6,100,476 A | 8/2000 | Adamietz et al. |
| 6,109,407 A | 8/2000 | Böckmann et al. |
| 6,111,577 A | 8/2000 | Zilles et al. |
| 6,139,468 A | 10/2000 | Goates et al. |
| 6,145,399 A | 11/2000 | Böckmann et al. |
| 6,151,978 A | 11/2000 | Huber |
| 6,154,201 A | 11/2000 | Levin et al. |
| 6,167,996 B1 | 1/2001 | Huber et al. |
| 6,215,470 B1 | 4/2001 | Rosenberg et al. |
| 6,219,034 B1 | 4/2001 | Elbing et al. |
| 6,324,928 B1 | 12/2001 | Hughes |
| 6,422,941 B1 | 7/2002 | Thorner et al. |
| 6,508,139 B2 | 1/2003 | Onodera |
| 2003/0090460 A1 * | 5/2003 | Schena et al. .............. 345/156 |

FOREIGN PATENT DOCUMENTS

| | | |
|---|---|---|
| JP | 02-109714 | 1/1992 |
| JP | 4092691 | 3/1992 |
| JP | 04-007371 | 8/1993 |
| JP | 405231509 A | 9/1993 |
| JP | H6-210065 | 8/1994 |
| JP | 05-193862 | 1/1995 |

OTHER PUBLICATIONS

Web page, "Auto Shift Manual Transmission and Select Shift Manual Transmission," at URL=http://media.ford.com/article_display.cfm?article_id=2578, pp. 1, printed May 1, 2001.

T. Fong et al., "Novel interfaces for remote driving: gestures, Haptic and PDA," pp. 12.

B. Hildreth et al., "DC Servo–Motors for High Performance, High Reliability Control Loading in Flight Simulators," Interservice/Industry Training Systems Conference, Proceedings pp. 255–262, (Nov. 6–8,–1990).

J. Corrao, "Control Loading," Flight Simulation Update, pp. 61, (Jan. 11–15, 1988).

J. Colgate, et al., "Implementation of Stiff Virtual Walls in Force–Reflecting Interfaces," pp. 4, (Sep. 22, 1993).

J. Rolfe, et al., "Flight simulation," Cambrige Aerospace Series, Cambridge, Cambridge University Press, (1986).

Adelstein, "A Virtual Environment System For The Study of Human Arm Tremor," Ph.D. Dissertation, Dept. of Mechanical Engineering, MIT, Jun. 1989.

Adelstein, "Design and Implementation of a Force Reflection Manipulandum for Manual Control research," DSC–vol. 42, Advances in Robotics, Edited by H. Kazerooni, pp. 1–12, 1992.

Aukstakalnis et al., "Silicon Mirage: The Art and Science of Virtual Reality," ISBN 0–938151–82–7, pp. 129–180, 1992.

Baigrie, "Electric Control Loading—A Low Cost, High Performance Alternative," Proceedings, pp. 247–254, Nov. 6–8, 1990.

Bejczy et al., "Kinesthetic Coupling Between Operator and Remote Manipulator," International Computer Technology Conference, The American Society of Mechanical Engineers, San Francisco, CA, Aug. 12–15, 1980.

Bejczy, "Sensors, Controls, and Man–Machine Interface for Advanced Teleoperation," Science, vol. 208, No. 4450, pp. 1327–1335, 1980.

Bejczy, "Generalization of Bilateral Force–Reflecting Control of Manipulators," Proceedings Of Fourth CISM–IFToMM, Sep. 8–12, 1981.

Bejczy, et al., "Universal Computer Control System (UCCS) For Space Telerobots," CH2413–3/87/0000/0318501.00 1987 IEEE, 1987.

Bejczy et al., "A Laboratory Breadboard System For Dual–Arm Teleoperation," SOAR '89 Workshop, JSC, Houston, TX, Jul. 25–27, 1989.

Brooks et al., "Hand Controllers for Teleoperations—A State–of–the–Art Technology Survey and Evaluation," JPL Publication 85–11; NASA–CR–175890; N85–28559, pp. 1–84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25–44, May 2, 1993.

Caldwell et al., "Enhanced Tactile Feedback (Tele–Taction) Using a Multi–Functional Sensory System," 1050–4729/93, pp. 955–960, 1993.

"Cyberman Technical Specification," Logitech Cyberman SWIFT Supplement, Apr. 5, 1994.

Eberhardt et al., "OMAR—A Haptic display for speech perception by deaf and deaf–blind individuals," IEEE Virtual Reality Annual International Symposium, Seattle, WA, Sep. 18–22, 1993.

Eberhardt et al., "Including Dynamic Haptic Perception by The Hand: System Description and Some Results," DSC–vol. 55–1, Dynamic Systems and Control: vol. 1, ASME 1994.

Gobel et al., "Tactile Feedback Applied to Computer Mice," International Journal of Human–Computer Interaction, vol. 7, No. 1, pp. 1–24, 1995.

Gotow et al., "Controlled Impedance Test Apparatus for Studying Human Interpretation of Kinesthetic Feedback," WA11–11:00, pp. 332–337.

Howe, "A Force–Reflecting Teleoperated Hand System for the Study of Tactile Sensing Precision Manipulation," Proceedings of the 1992 IEEE International Conference on Robotics and Automation, Nice, France, May 1992.

IBM Technical Disclosure Bullein, "Mouse Ball–Actuating Device With Force and Tactile Feedback," vol. 32, No. 9B, Feb. 1990.

IWATA, "Pen–based Haptic Virtual Environment," 0–7803–1363–1/93 IEEE, pp. 287–292, 1993.

Jacobsen et al., "High Performance, Dextrous Telerobotic Manipulator With Force Reflection," Intervention/ROV '91 Conference & Exposition, Hollywood, Florida, May 21–23, 1991.

Jones et al., "A perceptual analysis of stiffness," ISSN 0014–4819 Springer International (Springer–Verlag); Experimental Brain Research, vol. 79, No. 1, pp. 150–156, 1990.

Kaczmarek et al., "Tactile Displays," Virtual Environment Technologies.

Kontarinis et al., "Display of High–Frequency Tactile Information to Teleoperators," Telemanipulator Technology and Space Telerobotics, Won S. Kim, Editor, Proc. SPIE vol. 2057, pp. 40–50, Sep. 7–9, 1993.

Marcus, "Touch Feedback in Surgery," Proceedings of Virtual Reality and Medicine The Cutting Edge, Sep. 8–11, 1994.

McAffee, "Teleoperator Subsystem/Telerobot Demonsdtrator: Force Reflecting Hand Controller Equipment Manual," JPL D–5172, pp. 1–50, A1–A36, B1–B5, C1–C36, Jan. 1988.

Minsky, "Computational Haptics: The Sandpaper System for Synthesizing Texture for a Force–Feedback Display," Ph.D. Dissertation, MIT, Jun. 1995.

Ouh–Young, "Force Display in Molecular Docking," Order No. 9034744, p. 1–369, 1990.

Ouh–Young, "A Low–Cost Force Feedback Joystick and Its Use in PC Video Games," IEEE Transactions on Consumer Electronics, vol. 41, No. 3, Aug. 1995.

Ouhyoung et al., "The Development of A Low–Cost Force Feedback Joystick and Its Use in the Virtual Reality Environment," Proceedings of the Third Pacific Conference on Computer Graphics and Applications, Pacific Graphics '95, Seoul, Korea, Aug. 21–24, 1995.

Patrick et al., "Design and Testing of A Non–reactive, Fingertip, Tactile Display for Interaction with Remote Environments," Cooperative Intelligent Robotics in Space, Rui J. deFigueiredo et al., Editor, Proc. SPIE vol. 1387, pp. 215–222, 1990.

Pimentel et al., "Virtual Reality: through the new looking glass," $2^{nd}$ Edition; McGraw–Hill, ISBN 0–07–050167–X, pp. 41–202, 1994.

Rabinowitz et al., "Multidimensional tactile displays: Identification of vibratory intensity, frequency, and contactor area," Journal of The Acoustical Society of America, vol. 82, No. 4, Oct. 1987.

Russo, "The Design and Implementation of a Three Degree of Freedom Force Output Joystick," MIT Libraries Archives Aug. 14, 1990, pp. 1–131, May 1990.

Russo, "Controlling Dissipative Magnetic Particle Brakes in Force Reflective Devices," DSC–vol. 42, Advances in Robotics, pp. 63–70, ASME 1992.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Expploration, Rensselaer Polytechnic Institue, Sep. 30–Oct. 1, 1992.

Snow et al., "Model–X Force–Reflecting–Hand–Controller," NT Control No. MPO–17851; JPL Case No. 5348, pp. 1–4, Jun. 15, 1989.

Stanley et al., "Computer Simulation of Interacting Dynamic Mechanical Systems Using Distributed Memory Parallel Processors," DSC–vol. 42, Advances in Robotics, pp. 55–61, ASME 1992.

Tadros, "Control System Design for a Three Degree of Freedom Virtual Environment Simulator Using Motor/Brake Pair Actuators", MIT Archive © Massachusetts Institute of Technology, pp. 1–88, Feb. 1990.

Terry et al., "Tactile Feedback In A Computer Mouse," Proceedings of Fouteenth Annual Northeast Bioengineering Conference, University of New Hampshire, Mar. 10–11, 1988.

International Searching Authority, PCT International Search Report, 72 pages.

* cited by examiner

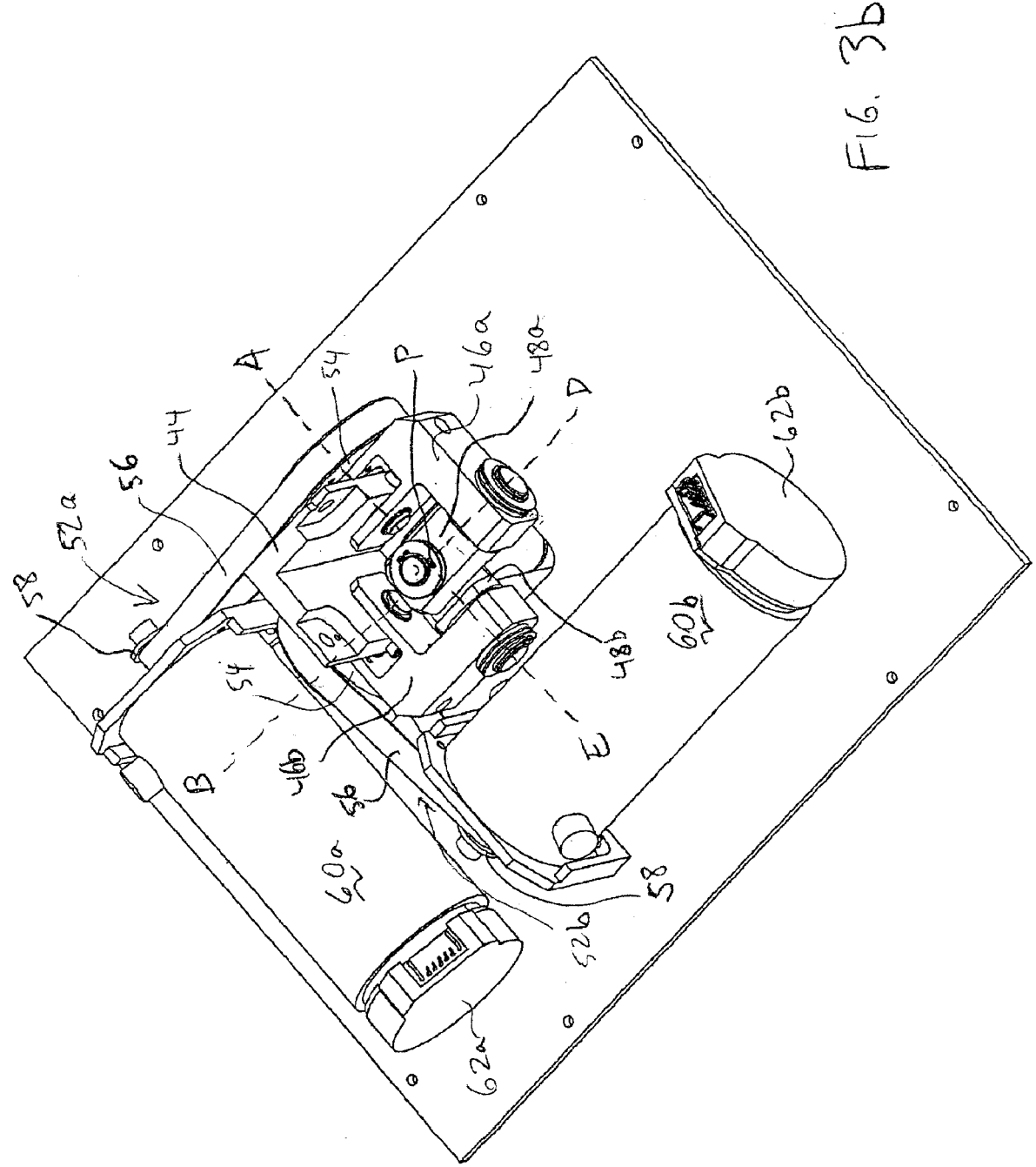

HAPTIC SHIFTING DEVICES

BACKGROUND OF THE INVENTION

This invention relates generally to haptic feedback devices, and more particularly to haptic feedback interface devices used in conjunction with mechanical devices allowing desired manipulation of the interface device.

Control of a vehicle through the use of electronically-controlled mechanisms rather than mechanically-controlled mechanisms has been implemented in several different forms. Typically called "steer-by-wire," "drive-by-wire," or "control-by-wire", this form of control allows the user to direct electric motors and/or hydraulic or pneumatic control systems, to perform mechanical operations rather than the user directly performing the mechanical operations using a mechanism. For example, in a standard mechanical steering mechanism in an automobile, the user moves a steering wheel, which mechanically rotates rods, gears, and other mechanical parts to turn the front wheels based on the motion of the steering wheel. In a drive-by-wire system, the user rotates the steering wheel (or moves some other type of manipulandum), which controls one or more electric motors, hydraulic actuators, etc., to turn the front wheels based on steering wheel motion—there is no actual mechanical linkage between steering wheel motion and wheel motion (unlike power assisted steering). A processor (microprocessor, etc.) can be used to sense user motion and correlate it with motor control to achieve the corresponding steering. There are several advantages of control-by-wire over traditional mechanical control, including safety, since there is no mechanism to injure the user; less effort or force required by the user to manipulate the control device; more flexibility in type and motion of the control device used and in the control methods over the mechanism; less weight for the mechanism; less skill required by the user in performing control tasks since a control processor can translate simple user motions into the complex control of motors needed to perform the desired mechanical action; engineering advantages (e.g., it is easier to put a steering wheel in either side of a car when using steer-by-wire); and the use of control methods such as adaptive steering algorithms.

A related control-by-wire embodiment is "shift-by-wire," in which an automobile or other vehicle having a driving transmission is shifted through its transmission gears using electronic control rather than direct mechanical control. Thus, instead of the user moving a shift lever to predetermined mechanical positions to mechanically change gears, the user can manipulate an electronic control and the electronic system can change the actual transmission gears. For example, the user can move a small lever forward to increase a gear ratio (e.g., from first gear to second gear), or move the lever backward to decrease the gear ratio (e.g., from fifth gear to fourth gear). A variety of different electronic controls can be used in the vehicle to allow the user to shift, such as levers, buttons, knobs, switches, etc.

One problem with existing shift-by-wire systems is that they are still limited to a particular implementation of the physical control manipulated by the user. That is, the user cannot change to a different shift pattern if he or she so desires. Furthermore, shift-by-wire controls do not offer the user some of the cues of mechanical systems in controlling shifting, which may cause the control to be unintuitive or less precise. Since shifting is performed almost entirely by feel, such mechanical cues can be important in shifting tasks.

SUMMARY OF THE INVENTION

To alleviate some of the problems in existing shift-by-wire systems, the inventions disclosed herein provide haptic sensations for a shift-by-wire system. Haptic sensations allow a great range of programmed control schemes and patterns in a control and can provide more effective user control over gear selection and other operations.

More particularly, in one embodiment a haptic shift device for a vehicle includes a shift lever physically contacted and manipulatable by a user in at least one degree of freedom. At least one sensor detects a position of the shift lever, where position data representative of the position is derived from the sensor. A processor receives the position data and outputs data causing a transmission gear of the vehicle to be changed based on the position of the shift lever. And, at least one electrically-controlled actuator outputs a force on the shift lever.

In some embodiments, the shift lever is moveable within a pattern and is blocked from areas outside the boundaries of the pattern. The shift lever can be blocked from the outside areas by a barrier force output by the actuator. The actuator(s) can be an active actuator operative to output active forces on the shift lever, or a passive actuator operative to provide resistance forces on the shift lever; or a combination of passive and active actuators can be used in various degrees of freedom of the shift lever. For example, the active actuator portion can output haptic effects on the shift lever and the passive portion can provide forces to block the shift lever from moving outside a predetermined pattern. A mechanical gate can be used to block the shift lever from at least some of the outside areas. The mechanical gate can be used to provide at least two different patterns, such as a manual transmission pattern and an automatic transmission pattern. A variable mechanical gate can also be used to allow mechanical barriers to be provided for the shift lever in all directions in the manual and automatic modes.

In another invention, a haptic shift device for a vehicle includes a shift lever physically contacted and manipulatable by a user in two degrees of freedom. At least one sensor detects a position of the shift lever, where position data derived from the sensor is used to cause a transmission gear of the vehicle to be changed based on the lever position. At least one electrically-controlled actuator outputs a force on the shift lever, and a mode selector allows the user to select a shifting mode, where at least two shifting modes have different shifting patterns for the shift lever. The shift lever can be blocked from areas outside the boundaries of the shifting pattern, e.g., by a barrier force output by the actuator. The shifting modes can include an automatic mode, a manual mode, and/or a sequential mode. Active and/or passive actuators and mechanical gates can be used in various embodiments and haptic effects of different types can be output on the shift lever.

In another invention, a method for shifting gears of a vehicle transmission includes providing a shift lever to be physically contacted and moved by a user in at least one degree of freedom. A position of the shift lever is detected and position data is derived from the sensor. Data causing a transmission gear of the vehicle to be changed based on the position of the shift lever is output, and a force is output on the shift lever using the electrically controlled actuator. The shift lever can be made moveable within a pattern and blocked from areas outside the boundaries of the pattern, e.g., by a barrier force output by the actuator. Active and/or passive actuators and mechanical gates can be used and haptic effects of different types can be output on the shift lever.

In another invention, a haptic shift device for a vehicle includes a shift lever physically contacted and manipulatable by a user in two degrees of freedom, at least one sensor to detect a position of the shift lever, where a transmission gear of the vehicle can be changed based on the position of the shift lever, at least one electrically-controlled actuator to output a force on the shift lever, and a mode selector allowing the user to select shifting modes of the haptic shift device, wherein shifting modes provide different physical characteristics for the shift lever. The different physical characteristics can include a different range of motion of the shift lever in at least two different modes. In some embodiments, the different physical characteristics can include different force sensations output in at least two different modes.

The present inventions provide a haptic shift device that allows haptic sensations to be output to the user of a shift-by-wire system in a vehicle. The haptic shift device provides forces that assist in implementing barriers to the shift lever, as well as allowing programming variability to the device. For example, several different shift patterns can be provided and can be selectable by the user. Furthermore, haptic sensations output on the shift lever assist the user in shifting tasks and can provide mechanical cues in a shift-by-wire system.

These and other advantages of the present invention will become apparent to those skilled in the art upon a reading of the following specification of the invention and a study of the several figures of the drawing.

BRIEF DESCRIPTION OF THE DRAWINGS

FIGS. 2, 3a, and 3b are perspective views of one embodiment of a mechanism for implementing the shift lever device of FIG. 1;

DETAILED DESCRIPTION OF PREFERRED EMBODIMENTS

Figure 1:
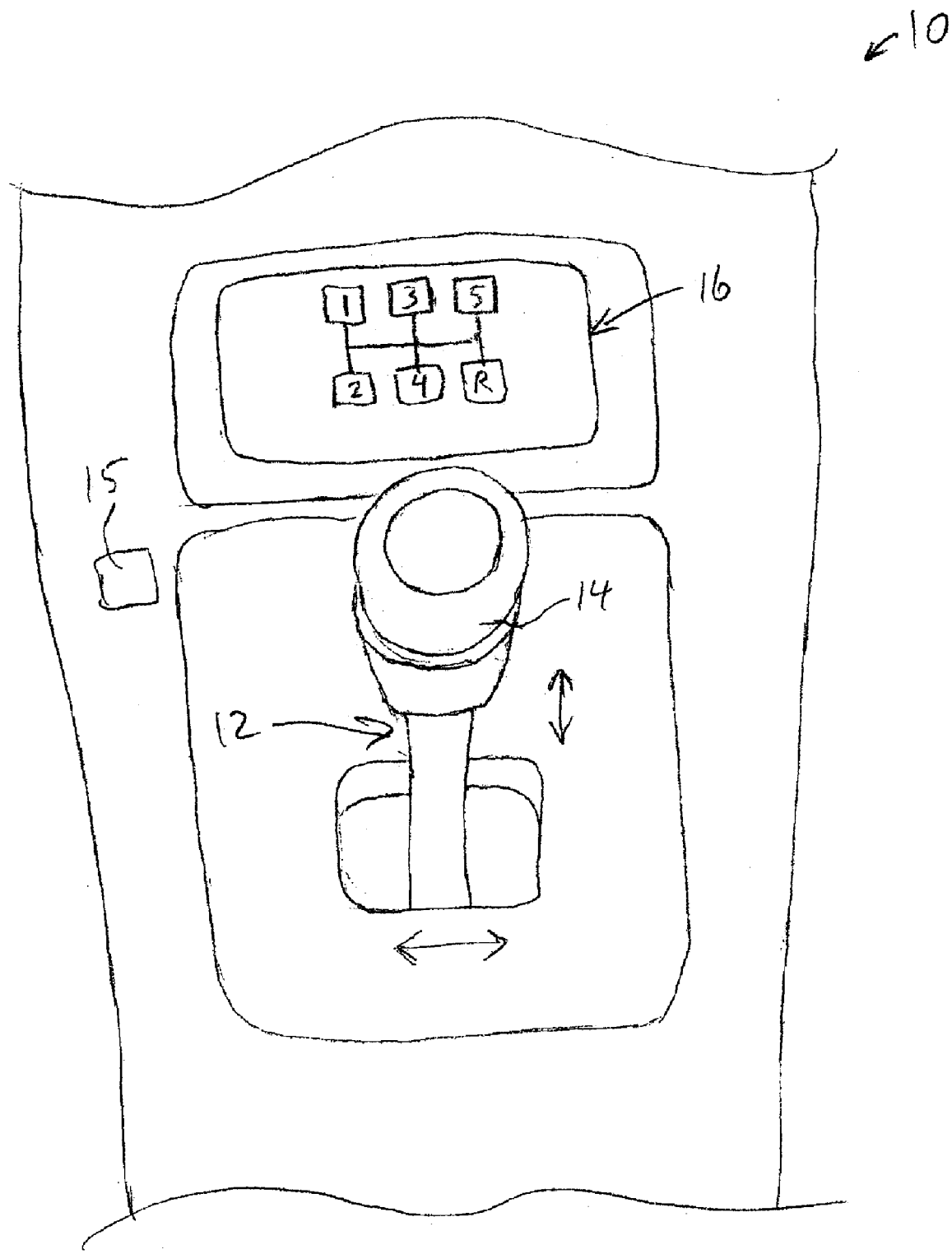
FIG. 1 is a perspective view of one embodiment of a gear shift device in a vehicle including a shift lever suitable for use with the present invention.

FIG. 1 is a perspective view of an example of a haptic shift device 10 for a vehicle. Shift device 10 is implemented in FIG. 1 similar to a standard gearshift lever as found in automobiles with manual transmission. For example, the shift device 10 can be located between the front seats in an automobile to allow the driver easy access to the shift device while driving.

Haptic shift device 10 includes a shift lever 12 including a grip 14 which is grasped or otherwise physically contacted by the user and moved by the user in one or more directions to control the gear of the transmission of the vehicle. The position of the shift lever determines in which transmission gear the vehicle is present engaged. Since the device is integrated in a shift-by-wire system, the shift lever is not mechanically coupled to the transmission of the vehicle, but is instead connected to an electronic interface and system that can read the position of the lever and control the transmission in response to the position of the lever. Examples of mechanisms and interfaces that can be used are described below with reference to FIGS. 2 and 3.

A mode selection control 15 can be included to allow the user to select a shifting mode of the haptic shift device 10. Control 15 is shown as a button in FIG. 1, but can be any suitable control, including a lever, switch, displayed button on display 16, etc. Control 15 can select, for example, between manual and automatic transmission modes, and/or between other shifting modes if implemented. Other options of the device can also be selected with control 15 or additional similar controls, such as manipulation features (damping force on the shift lever 12; magnitude, frequency, duration, or other characteristics of other haptic sensations output on the shift lever 12; etc.). In some embodiments, grip 14 can include one or more buttons or other controls 15 to allow the user to select modes, settings, or other features of the transmission or the vehicle. For example, a thumb button can be included which the user depresses to be allowed to select automatic or manual transmission gears with the shift lever 12. Control 15 can be positioned on a console, steering wheel, or other convenient location of a vehicle. Furthermore, one or more controls 15 can be included as software controls or switches such as buttons displayed on a display device 16. Voice control, such as commands spoken into a microphone by a user that are processed by a microprocessor, can also be used for the equivalent of control 15.

Preferably, the haptic shift lever can be in one of multiple available control modes, where each mode can offer different control and/or movement options. Furthermore, the particular embodiment that is implemented provides particular manipulation options for the user. For example, in some embodiments or modes, the shift lever 12 can be moved by the user in only one direction or degree of freedom, e.g. forward and back as in an automatic transmission. Other embodiments can allow left-right and forward-back motion, as in manual transmissions having an H pattern or the like. In yet other embodiments, non-Cartesian or diagonal motion can be allowed, for different shifting patterns. Some shifting modes may not change the shift pattern itself, but can adjust other shifting characteristics, such as the workspace (amount of movement allowed) of the shift lever, or the magnitude of output forces. Examples of shifting patterns and modes are described in greater detail below with respect to FIGS. 4, 5, and 6.

The manipulation of lever 12 is enhanced by haptic sensations that are output in the degrees of freedom of movement of the lever 12. Some haptic sensations are used to constrain the motion of the lever 12, while other haptic sensations can be used to provide particular sensations to the user in the motion of the lever 12. Such sensations are described in greater detail below.

Some embodiments of the haptic shift device 10 can include a display device 16, such as a flat screen. For example, an LCD, plasma, CRT, or other type of display screen can be used. The display can be located near the shift level 12 as shown, or elsewhere in the vehicle within the view of the driver, e.g. on the dashboard, instrument panel, heads-up display (HUD) on the windshield, etc. The display can show status information concerning the shift device 10 (e.g., the current gear selected) and the transmission and other systems of the vehicle. For example, if multiple shift patterns or modes are selectable on the haptic shift device, the currently-active shift pattern can be displayed, as shown in FIG. 1, where the standard 5-speed manual transmission configuration is displayed. Other patterns can be similarly graphically displayed to assist the user in knowing to which positions the shift lever 12 can be moved. In some embodiments, display 16 can include a touch-sensitive surface to allow a user to "touch" displayed images or selections directly on the surface of the display 16 to select those images and an associated mode, setting or function.

In other embodiments, different implementations of the haptic shift device 10 can be employed. For example, the lever 12 can be located on the steering column of the vehicle. Alternatively, a different control can be provided on a dashboard, floor, a door, or other surface in the vehicle within easy reach of the driver and used to select gears, and can be provided with haptic sensations. The shift lever can be used in a variety of vehicles that may require shifting of transmission gears or similar functions, including automobiles, trucks, military vehicles, industrial vehicles, and other large vehicles, boats or ships, aircraft, space vehicles, underwater vehicles, etc. Some alternate embodiments can provide a haptic shifter of the present invention on a remote control device that remotely controls a vehicle or toy. In yet other alternate embodiments, the haptic shifter of the present invention can be used in computer simulations of vehicle control, such as using a display screen to depict te illusion of moving through surroundings in a vehicle. Herein, the term "vehicle" is intended to refer to a physical vehicle, not a simulated vehicle (as in a computer simulation or video game).

Figure 2:
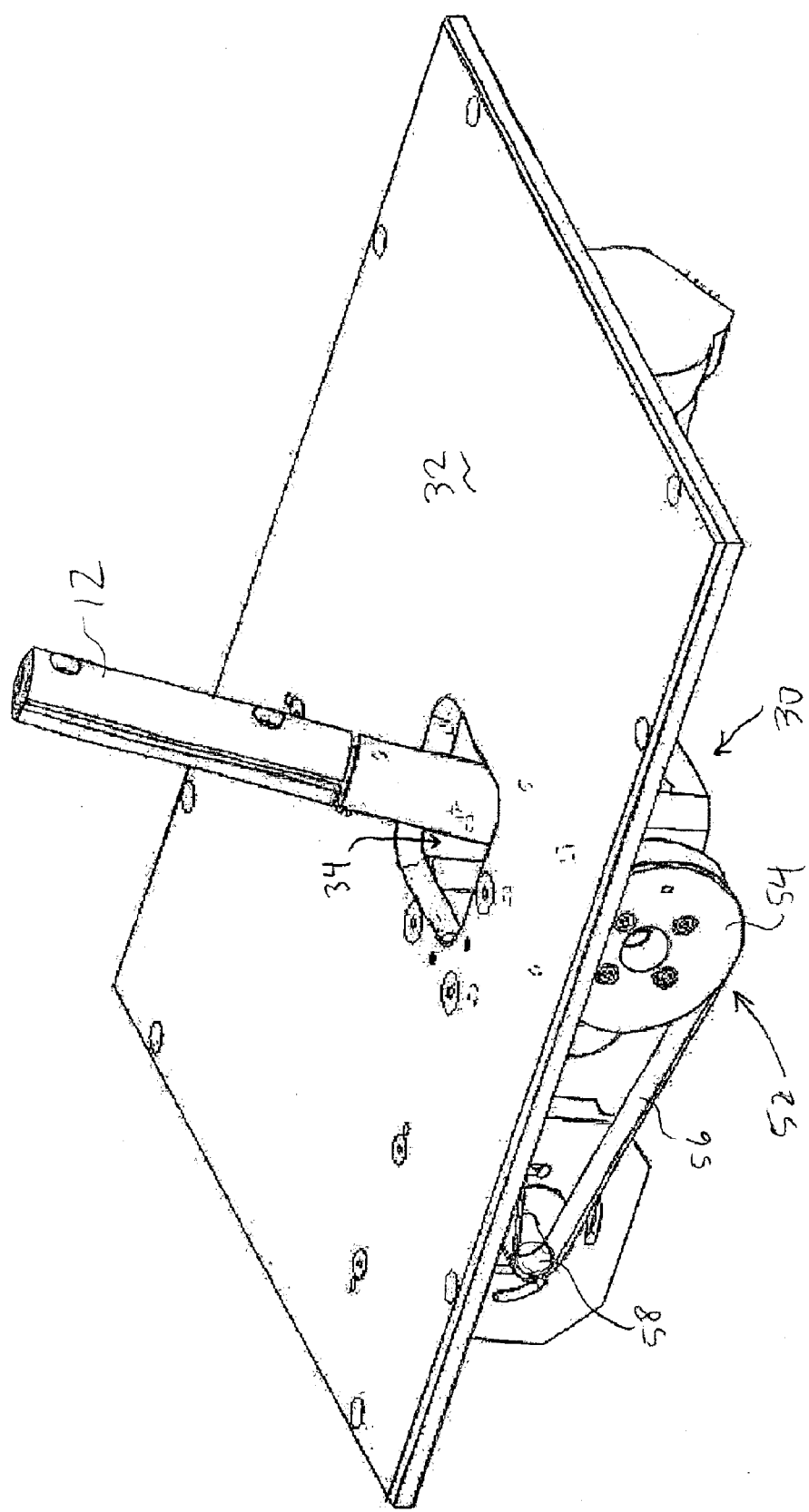

FIGS. 2 and 3 are perspective views of one embodiment of a mechanism 30 that can be used for the haptic shift device 10 to output forces on the shift lever 12. In this embodiment, a linkage and amplification mechanism transfers forces from motors to the haptic shifter to provide high magnitude forces to the user.

Mechanism 30 can be positioned below a plate 32 (shown in FIG. 2) which includes an opening 34 through which the shift lever 12 extends. (The grip 14 on the shift lever 12 is not shown in FIGS. 2 and 3). The mechanism 30 can be mounted to the plate 32 or to another grounded surface. The sides to the opening 34 can act as hard stops to the motion of the shift lever 12, where the opening 34 is sized to allow the preferred workspace size for the shift lever. This embodiment allows the shift lever 12 to be moved anywhere in a two-degree-of-freedom workspace. Other embodiments, described below, can include a mechanical gate on the opening 34 to restrict the mechanical motion of the shift lever to a desired pattern.

Mechanism 30 includes a linkage 36 of members that are rotatably coupled to each other. In the described embodiment, mechanism 30 is a gimbal mechanism which provides two rotary degrees of freedom to the shift lever 12. The mechanism 30 couples the shift lever 12 to a grounded or reference surface, such as plate 32 or other ground.

Gimbal mechanism 30 is preferably a five-member, closed-loop parallel linkage that includes a ground member 44, extension members 46a and 46b, and central members 48a and 48b. Ground member 44 is provided as a base member that is rigidly coupled to the plate 32 or other grounded surface and which provides stability for mechanism 30. Ground member 44 can be shaped as a 90-degree "L" piece to allow the extension members to be easily coupled to it, as shown.

The members of gimbal mechanism 30 are rotatably coupled to one another through the use of bearings or pivots, wherein extension member 46a is rotatably coupled to ground member 44 and can rotate about an axis A, central member 48a is rotatably coupled to extension member 46a and can rotate about a floating axis D, extension member 46b is rotatably coupled to ground member 44 and can rotate about axis B, central member 48b is rotatably coupled to extension member 46b and can rotate about floating axis E, and central member 48a is rotatably coupled to central member 48b at a center point P at the intersection of axes D and E. A bearing (not shown) rotatably couples the two central members 48a and 48b together at the intersection point P. Central member 48a is rotatably coupled to one end of extension member 46a and extends at a substantially parallel relation with axis B. Similarly, central member 48b is rotatably coupled to an end of extension member 46b and extends at a substantially parallel relation to axis A. The axes D and E are "floating" in the sense that they are not fixed in one position as are axes A and B. Axes A and B are substantially mutually perpendicular.

Gimbal mechanism 30 is formed as a five-member ("five-bar") closed chain. Each end of one member is coupled to the end of another member. The five-bar linkage is arranged such that extension member 46a, central member 48a, and central member 48b can be rotated about axis A in a first degree of freedom. The linkage is also arranged such that extension member 46b, central member 48b, and central member 48a can be rotated about axis B in a second degree of freedom. This structure is also disclosed in U.S. Pat. Nos. 5,731,804 and 6,104,382, which are incorporated by reference herein in their entireties.

Shift lever or handle 12 is coupled to one of the central members 48a or 48b (member 48b as shown) of gimbal mechanism 30 such that it extends out of the plane defined by axes D and E. Gimbal mechanism 30 provides two degrees of freedom to handle 12 positioned at or near to the center point P of rotation. The handle 16 can be rotated about axes A and B or have a combination of rotational movement about these axes. As handle 12 is moved about axis A, floating axis D varies its position, and as joystick handle 16 is moved about axis B, floating axis E varies its position.

In alternate embodiments, additional degrees of freedom can be provided. For example, the handle 12 can be rotated about axis C extending perpendicularly from the plane formed by floating axes D and E. This rotational degree of freedom can be provided with a sensor and/or an actuator to sense motion and apply forces in that degree of freedom. Additionally, a different degree of freedom can be added such that handle 12 can be linearly translated along floating axis C. This degree of freedom can also be sensed and actuated, if desired.

Figure 3A:
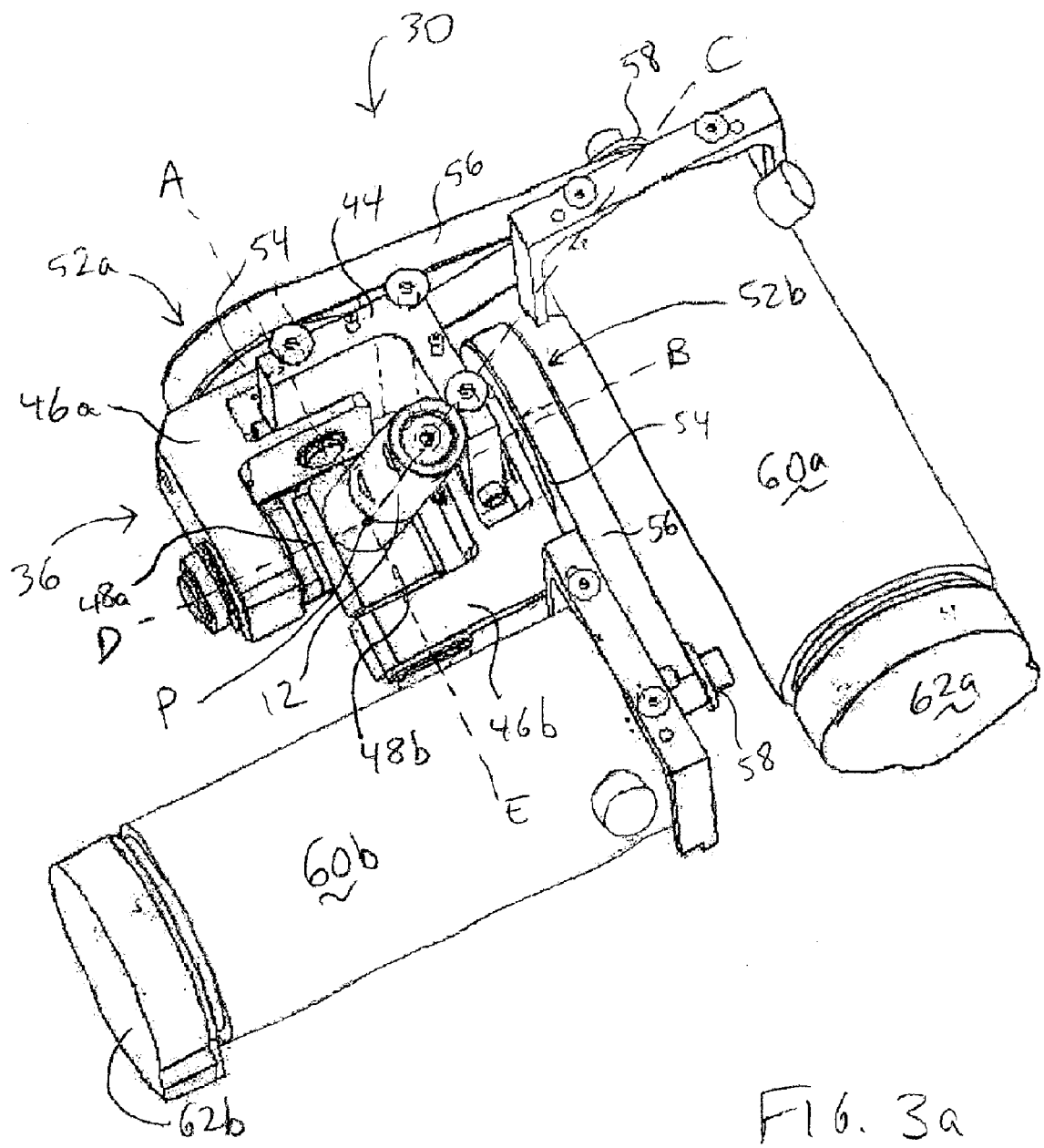

Gimbal mechanism 30 also may include an amplification drive mechanism, such as belt drives, capstan drives, gear drives, etc. In the embodiment of FIGS. 2 and 3a–3b, belt drives 52a and 52b are provided. The belt drives 52 each include a drum 54 around which a belt 56 is routed. Each drum is connected to an associated extension member 46 so that the drum rotates about axis A (and the other drum rotates about axis B). Each belt 56 is also routed around a spindle 58 which is coupled to the rotating shaft of an actuator 60a or 60b. Each actuator 60 is preferably grounded to the plate 32, ground member 44, or other grounded surface and outputs a rotary force on the shaft to rotate the spindle 58, where the belt 56 transmits the force to the drum 54 to output a force on the handle 12. The ratio of spindle 58 to drum 54 allows the amplification of forces output by the actuator. In the embodiment shown, for example, actuators 60 are DC motors. The actuators can be of other types in other embodiments, such as voice coils, linear actuators, moving magnet actuators, passive actuators (e.g. brakes), pneumatic actuators, etc. Passive actuators such as brakes output a resistance force on motion of the shift lever imparted by the user, rather than outputting an active force on the lever independently of the user as with active actuators.

Also preferably coupled to gimbal mechanism 30 are sensors 62a and 62b, which, in the described embodiment, are coupled to the rotating shafts and housings of actuators 60a and 60b, respectively. Sensors 62 are preferably relative optical encoders which provide signals to measure the angular rotation of the actuator shaft, which is also indicative of the position of the handle in the degree of freedom associated with that actuator. The electrical outputs of the encoders can be routed to a processor (e.g. a local processor or host processor) as detailed below with respect to FIG. 7. The sensors can be located in other positions on the gimbal mechanism in other embodiments, such as at the coupling of extension member and ground member, etc. Other types of sensors can also be used, such as potentiometers, Hall effect sensors, resolvers, or other analog or digital sensors. It should be noted that the present invention can utilize either absolute or relative sensors.

Haptic Shift Patterns and Modes

Using the haptic shifting device described above, a variety of haptic shift patterns can be implemented to allow the user to select transmission gears (or make selections in other types of computer interface applications). The shift patterns typically have areas or zones where the shift lever 12 is allowed to move, typically where selections (such as gear selections) are positioned; and "blocked" areas or zones outside the boundaries of the permissible areas to which the lever 12 is not desired to be positioned, and therefore not allowed to be moved to. The advantage of providing shift patterns using a haptic device as opposed to solely using mechanical selection is that multiple different shift patterns can be implemented with a single device, and in several embodiments the patterns can be changed using actuators and without moving any mechanical parts.

Figure 4A:
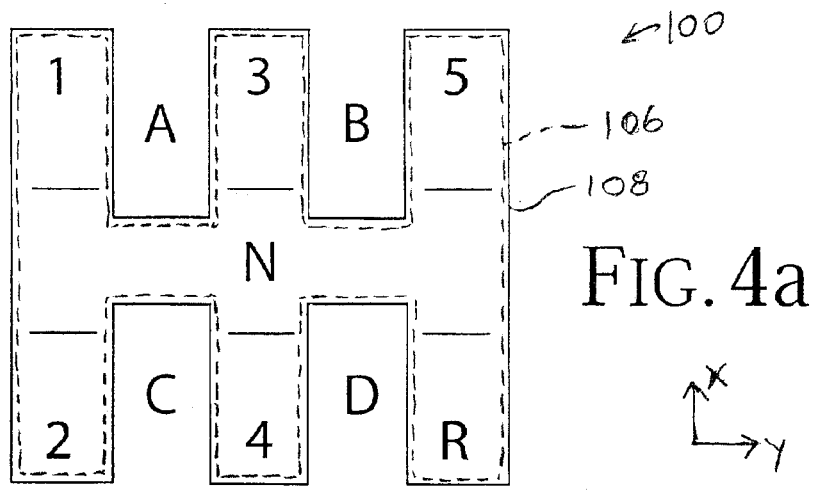
FIGS. 4a–4d are diagrammatic illustrations of shift patterns suitable for use with the shift lever device of FIGS. 1–3b.
Figure 4B:
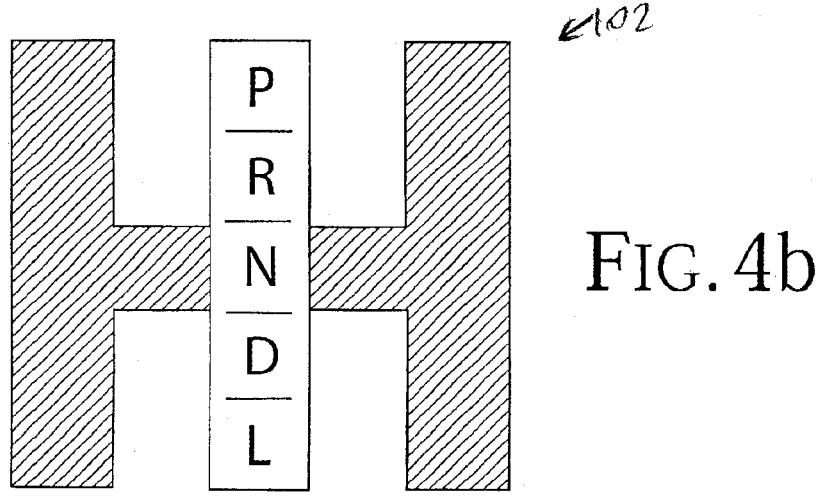
Figure 4C:
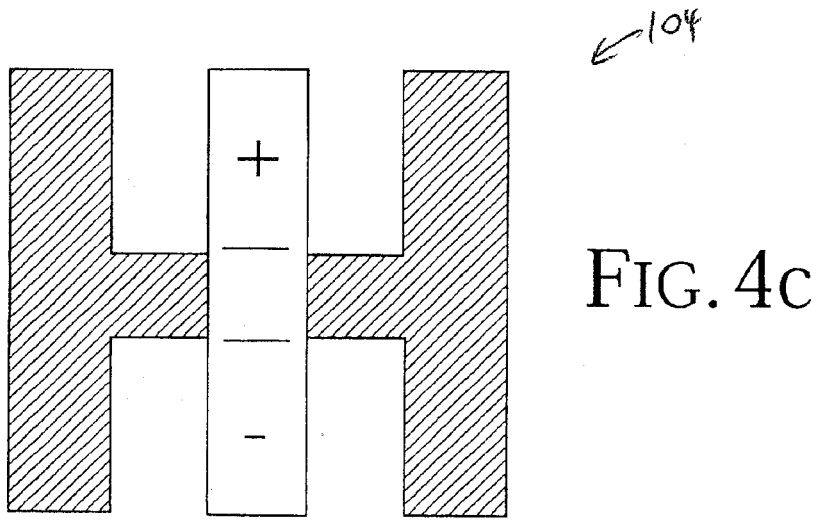

FIGS. 4a, 4b, and 4c illustrate three different shift patterns for gear selection in a vehicle that can be implemented with a haptic shifter device of the present invention. These are just examples of the many possible different patterns that are possible.

FIG. 4a illustrates a standard manual transmission shift pattern 100 ("H" pattern) for a 5-speed transmission having five forward gears, one reverse gear, and a neutral or idle gear. In one standard configuration, the first, third, and fifth gears are in the forward direction, and the second, fourth, and reverse gears are in the backward direction, with neutral being in the center position. The outline represents the areas in which the shift lever 12 may be moved, and the areas labelled A, B, C, and D represent the blocked areas that the shift lever 12 is not allowed to move into, where the lever runs into a barrier (mechanical or haptic) to prevent entry into those areas.

FIG. 4b illustrates a typical basic automatic transmission shifting pattern 102 for a vehicle. In a standard automatic transmission, the shifting is performed in a single linear dimension, with the standard gears "park" (P), "reverse" (R), "neutral" (N), "drive" (D), and "low gear" (L) selectable by the shift level in a sequential order. The shift lever is unable to move into blocked areas outside the linear pattern.

With a haptic shifter device of the present invention, both the manual and the automatic transmission patterns can be implemented in a single device as different shifting modes. The user can select which pattern mode is currently active, and thus which transmission scheme is implemented. For example, the user can select a separate control such as a button, switch, or lever to change the shift pattern. Once the pattern is selected, the user can then move the shift lever 12 within the areas allowed within the new pattern. One way to represent the automatic transmission pattern within the shift pattern of the manual transmission as shown in FIG. 4a is to provide the linear automatic transmission within one of the vertical channels of the manual transmission pattern. For example, as shown in FIG. 4b, the automatic transmission pattern can be provided within the center vertical channel of the manual transmission pattern (where the 3-N-4 gears are located in FIG. 4a). In other embodiments, the automatic transmission pattern can be located in one of the other vertical channels, or separate from the manual pattern, e.g. to the side of the manual pattern.

FIG. 4c is an example of another shift pattern 104 selectable by the user for the haptic shift device 10, this one being a "sequential" transmission. Similar to the automatic transmission, only a single linear channel is provided. The shift lever 12 can be moved by the user up to the "+" symbol area to shift the transmission up one gear, and the lever can be moved back to the "−" symbol area to shift the transmission down one gear. In some embodiments, the user must move the lever to the center position and then to the desired selection before an additional sequential selection can be made. The center area between plus and minus symbols can be a neutral gear or selection. Some embodiments can provide a spring return force on the shift lever to automatically return the lever to the center position. Such a spring return force can be implemented with mechanical springs, and/or as a spring force output by an actuator 60.

Other types of patterns are possible in other embodiments. For example, the manual transmission pattern can arrange the gears radiating from a center point, or in horizontal or diagonal channels. Additional shift patterns can be included in the list of possible shift patterns selectable by the user.

Figure 4D:
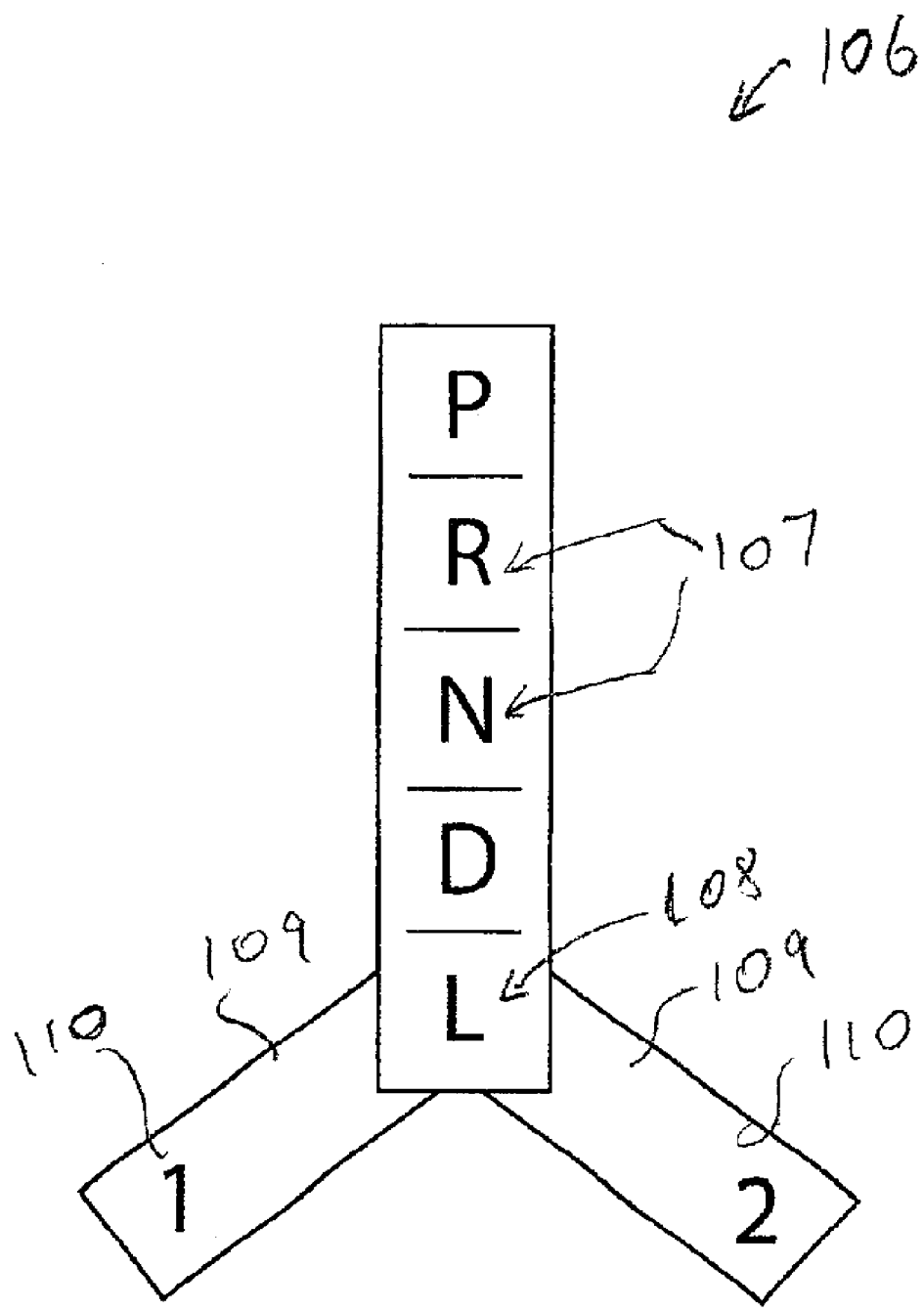

For example, FIG. 4d illustrates another possible shift pattern 106 for use with the haptic shifter of the present invention, in which diagonal channels are provided. In this shift pattern example, the automatic gears 107 are arranged in a linear pattern similar to other automatic modes. From the low gear "L" 108, two other low gear selections 110 are selectable by the user. In this example, the shift lever 12 can be moved from the L gear 108 through either diagonal channel 109 to select the low gears 110. Other embodiments of shift patterns can include diagonal channels in a variety of configurations as well. The diagonal channels can be implemented using passive and/or active forces and/or mechanical gates, similarly to those embodiments described below.

Other modes besides shift pattern modes can be implemented in a haptic shifter device of the present invention. For example, one mode may provide a large workspace for the shift lever for those users that prefer moving the lever 12 larger distances. A different mode, selected by the user, can provide a smaller workspace for the shift lever for those users that prefer a shorter "throw" to the lever. The smaller workspace can be implemented using actuators to cause barrier forces before the mechanical barriers are reached by the lever.

Other modes can also be implemented. For example, one mode may cause a particular set of force sensations to be output, while a different mode can cause a different set of force sensations to be output. In one example, one mode can provide force sensations only for lever motion into barriers such as the pattern limits, while another mode can provide barrier sensations as well as other types of force sensations such as detents, hills, etc. for lever motion not into barriers. The user may be able to set up particular force sensation profiles that are customized for his or her preferences. In addition, a magnitude control can be provided to globally adjust the gain of all force sensations output on the shift lever.

Haptic Shifter Implementations

Several different implementations are possible for the haptic shift device 10, some implementations using all haptic functionality and other implementations using a mix of haptic and mechanical components.

Fully Active Implementation

This implementation provides a full haptic implementation, in which forces and barriers output on the shift lever 12 are produced by the actuators 60. One example of this implementation is shown above in FIGS. 2, 3a, and 3b, where the shift lever has the full 2-degree-of-freedom workspace and the barriers within the shift pattern are caused by actuator output forces. The mechanism, actuator force transmission, and actuators preferably are scaled such that the resistive force can create "hard" barriers and boundaries that feel like mechanical barriers to lever motion. The actuators can output forces to act as a very high stiffness spring when the lever 12 is in an area where horizontal or vertical movement is not permitted. High-fidelity "hill" or detent sensations can be output when the lever 12 is moved into and out of gear or between selections, e.g. at the lines dividing selections as shown in FIGS. 4a–c. A hill sensation is a force that ramps up in magnitude with distance until the force "peak" or "summit" is reached (e.g., at the midpoint between selections), at which point the force switches direction and pushes the lever into the next selection, initially with high magnitude and sloping down as the lever moves further into the next selection. This is described in greater detail in copending application Ser. No. 09/783,936, which is incorporated herein by reference in its entirety. Other force sensations can also be provided between selections or at barriers, such as detents, springs, jolts, damping, vibrations, textures, etc., as described below.

In modes providing the automatic, sequential, or other similar linear shift patterns, the X-axis (left-right) actuator can always be outputting a high-stiffness spring force, e.g. in a "locked" spring mode, to provide barriers to horizontal motion. This force attempts to prevent any motion of the shift lever 12 to the left or right of the center channel. The Y-axis (forward-back) actuator can output force effects, such as hill effects, when the shift lever is moved between any of the selections.

One advantage of the fully active implementation is that an infinite variety of shift patterns can be provided and selected by the user, and the shift patterns can include diagonal as well as X- and Y-axis movements of the shift lever. Disadvantages include the high barrier forces required to prevent the user from moving the lever into blocked zones, which require larger and higher cost actuators, transmissions, and other components.

Fully Active Implementation with Gate

This implementation is similar to the fully active implementation described above, but adds a mechanical gate to the workspace of the shift lever 12. For example, the gate can be positioned over the opening 34 in the plate 32. The gate can simply provide an opening that is in the exact shape of one of the implemented patterns, and which allows additional patterns within the gate. For example, a manual transmission pattern gate, in the shape as shown by FIG. 4a, can be used, which also allows the automatic and sequential shift patterns of FIGS. 4b and 4c to be used.

The mechanical gate prevents the lever 12 from moving into the blocked areas (such as A, B, C, and D) by providing mechanical hard stops at the boundaries to those areas. This can be much more effective than the purely haptic implementation described above, since the mechanical hard stops cannot be overcome by a user and require no actuator output, allowing smaller actuators to be used for other haptic sensations. The actuators 60 can be used to output force sensations on the lever 12 when the lever moves between or into gear selections or out of the neutral positions, e.g. hill sensations, detents, etc. Actuators 60 can output barrier forces when necessary, e.g., the actuators 60 can output X-axis barrier forces in automatic, sequential, and other single vertical channel modes to prevent the lever 12 from moving out of the used Y-axis channel and into other manual transmission Y-channels. Thus, the gate adds a number of advantages to the fully active shifting device. One reason not to include the gate is to allow other, non-traditional shift patterns to be programmed in the haptic shifter, e.g. patterns having diagonal paths to select gears.

In some embodiments, a gate may not be desired to allow free motion of a lever within the entire range, or a particular range, of the lever. For example, some embodiments may use a lever for steering a vehicle in a steer-by-wire implementation. A steer-by-wire embodiment (e.g. using a lever or steering wheel) can use the haptic sensations and other features of the inventions discussed herein.

Some embodiments of this implementation can include both a mechanical wall using the mechanical gate as well as a haptic wall superimposed on or located just inside the mechanical wall. For example, the dashed line 106 of FIG. 4a can represent a haptic wall that exists just inside the mechanical gate, represented by the solid line 108. The distance of the haptic wall from the mechanical wall can be programmed by the designer, and preferably allows enough distance to implement a strong haptic repulsive spring. The haptic wall can be implemented as a stiff spring output by the actuators 60, as explained above, to prevent movement into the areas behind the boundaries of the permitted areas. The haptic wall can provide a small spring force to the lever that softens the impact of hitting the hard mechanical stop of the gate. In addition, use of the haptic wall can be less abusive to the mechanism, extending the life and reliability of the mechanism.

Figure 5A:
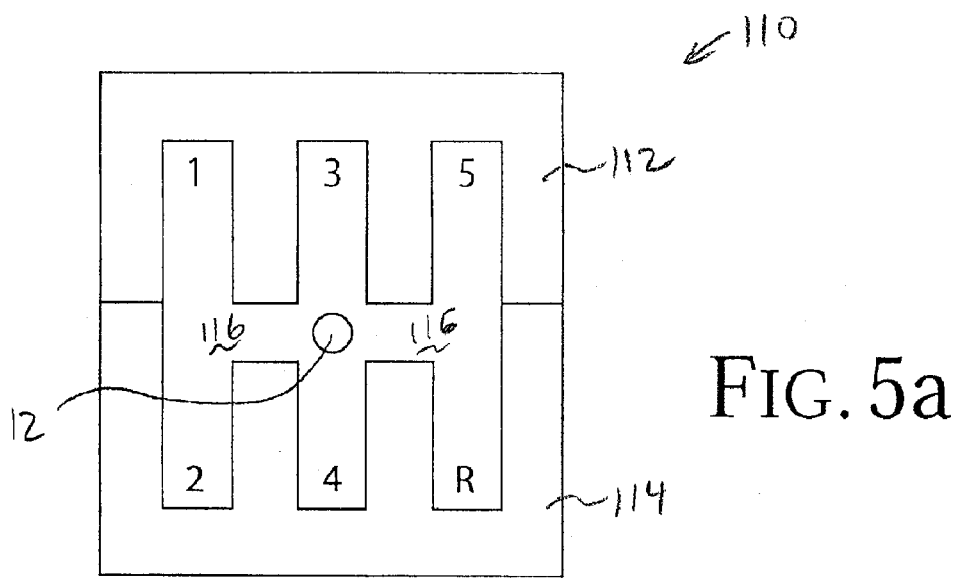
FIGS. 5a–5c are diagrammatic illustrations of a first embodiment of a mechanical gate of the present invention allowing multiple shift patterns.
Figure 5B:
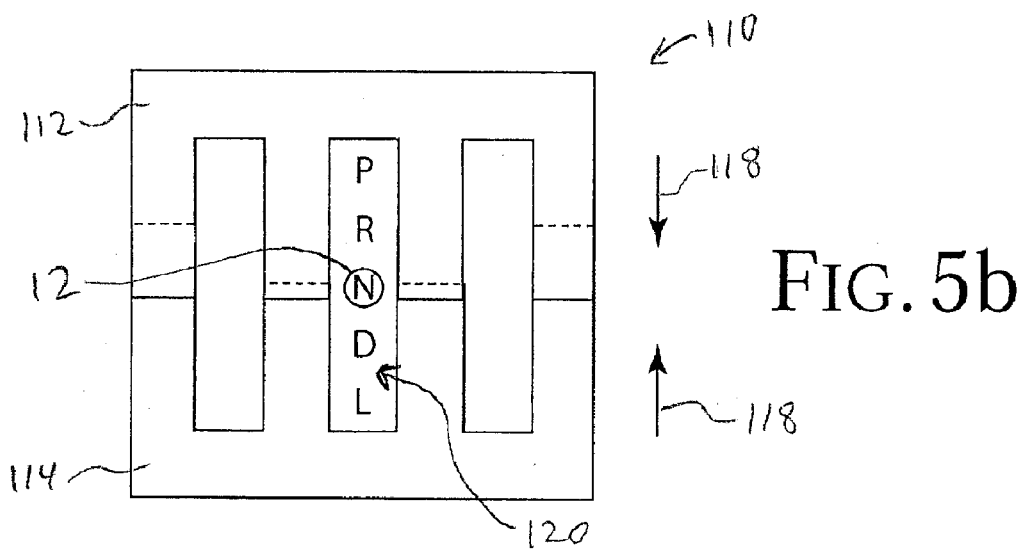
Figure 5C:
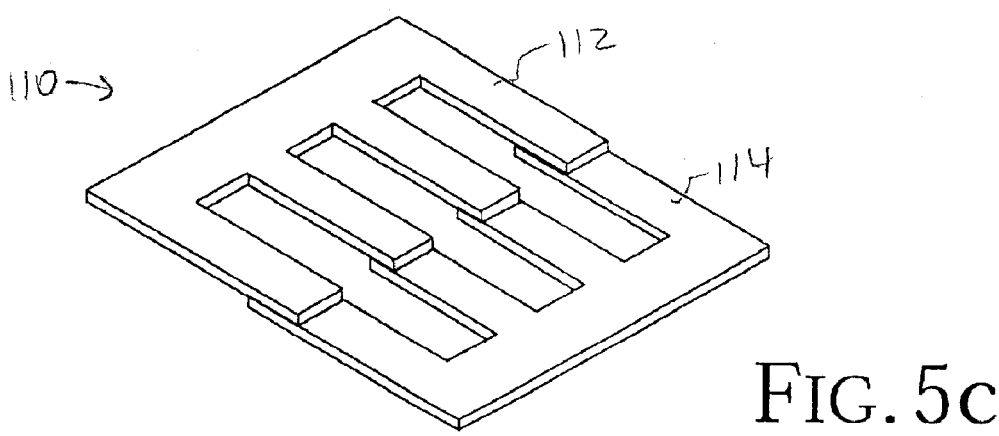

FIGS. 5a, 5b, and 5c illustrate an embodiment of the fully active implementation with a gate, where a variable mechanical gate is used to allow manual and automatic shifting patterns having completely enclosed mechanical barriers. In FIG. 5a, variable gate 110 is shown in a manual pattern position, where first portion 112 of the gate 110 is positioned adjacent to second portion 114 of the gate 110 to provide a middle X-axis (horizontal) channel 116. Shift lever 12 can move within the channel 116 to access the gear shift positions of the pattern as in a standard manual gearshift.

In FIG. 5b, the variable gate 110 has been slid or moved to provide an automatic transmission shift pattern having only a single vertical channel. First portion 112, second portion 114, or both first portion 112 and second portion 114, have been moved towards the shift lever 12 as indicated by arrows 118 to close the center X-axis channel 116, allowing the shift lever 12 to be moved only within the vertical channel 120. The automatic mode selections are implemented within the channel 120, e.g. with hill or other types of sensations provided between selections, etc.

FIG. 5c shows the portions 112 and 114 of the gate 110 in relation to each other. When in automatic transmission mode, one portion 112 can overlap the other portion 114 to close the horizontal channel 116. Portions 112 and/or portion 114 can be moved by motors, solenoids or other types of actuators (not shown) or, in some embodiments, can be manually moved by a user.

One advantage of the variable gate embodiment of FIGS. 5a–c is that no barrier forces need be output by the actuators in automatic mode to prevent horizontal movement of the shift lever, since the gate has moved to provide mechanical barriers that are more stiff than haptic barriers. This allows the actuators used in the device 10 to be smaller and output less force, since the haptic feedback from the actuators is used only to simulate springs, hills, detents, and similar sensations to enhance the selection process of the lever rather than to provide high force magnitude barriers to lever motion. In some embodiments, the X-actuator can be eliminated, while other more likely embodiments can use an X-actuator for providing a horizontal centering spring in appropriate shift patterns.

Figure 6A:
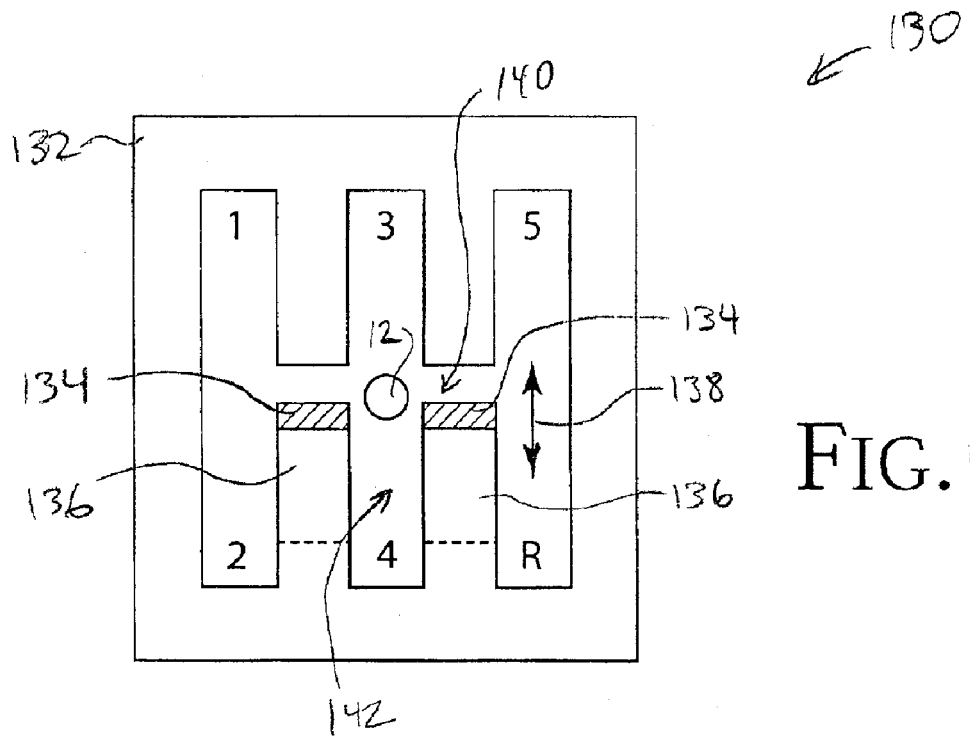
FIGS. 6a and 6b are diagrammatic illustrations of a second embodiment of a mechanical gate of the present invention allowing multiple shift patterns.
Figure 6B:
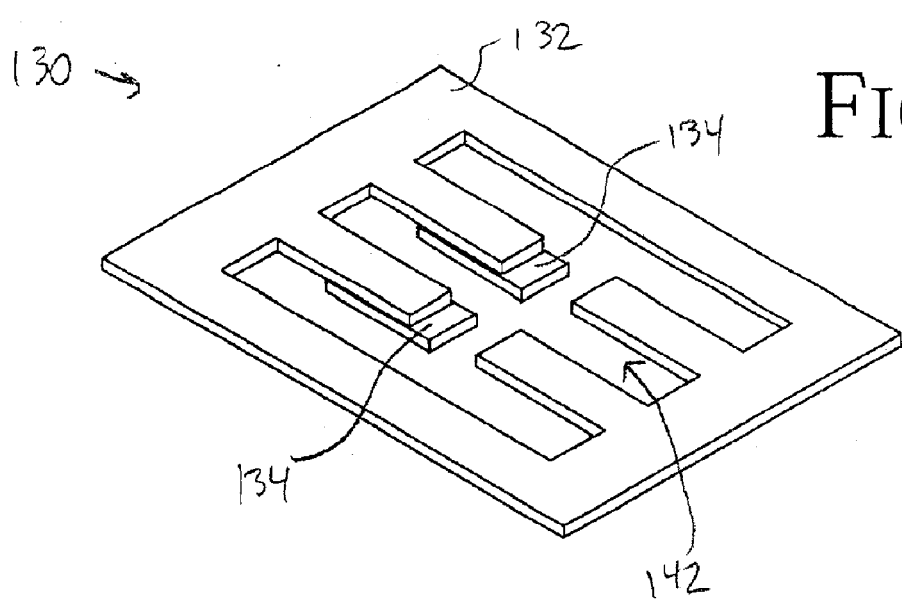

FIGS. 6a and 6b illustrate another embodiment 130 of a variable gate used with the fully active embodiment similar to the embodiment described with reference to FIGS. 5a–c. Gate 130 similarly provides mechanical stops to all motion of the shift lever 12 in both automatic and manual modes. In gate 130, a single gate portion 132 is provided in the manual shift pattern. Two gate fingers 134 are provided adjacent to the center projections 136 of the gate portion 132 and can be moved or slid as shown by arrow 138. When the fingers 134 are slid forward toward the gear positions 1, 3, and 5, they close off the center horizontal channel 140 to prevent the shift lever 12 from moving out of the vertical channel 141 when the device is in automatic mode. When the fingers 134 are retracted, in a direction toward the gear positions 2, 4, and R, the center horizontal channel 140 is open to allow the shift lever 12 to move into the other vertical channels in the manual transmission mode. The fingers can be moved independently to create additional shift patterns, if desired. As in the embodiment of FIGS. 5a–c, the gate 130 allows more rigid mechanical stops to be used in both modes, without requiring the actuators to output barrier forces to block lever movement. This allows lower cost and smaller actuators and/or simpler transmissions to be used in the device. Gate fingers 134 can be moved with dedicated actuators such as motors (not shown), or can be manually moved by the user when selecting the transmission mode.

Other implementations of variable mechanical gates can also be used. For example, linear-moving gate(s) can be used to block the diagonal channels for the manual gears 108 in the shift pattern of FIG. 4 in an automatic or sequential mode, and can be used to block the automatic gears in a manual mode. In another embodiment, a gate that moves in a rotational fashion can be implemented. For example, a number of plates can be arranged radially around a central shift lever, where one or more of the plates can be shifted or slid rotationally around the lever axis to open up one or more channels between the plates. This can allow horizontal, vertical, or diagonal channels for the shift lever to be moved through to select gears in particular shift pattern modes.

Active Y-Axis and Passive X-Axis Implementation

In this implementation of the haptic shifter device 10, the active actuator outputting forces in the X-axis, such as a DC motor, is replaced with a passive actuator, such as a brake, and a mechanical spring. Since the X-axis motion of the shift lever 12 is either fully locked out (in automatic or sequential modes) or is limited to linear motion with a centering spring in the center horizontal channel (neutral zone in a manual transmission), a fully active actuator may not be required in some embodiments. The brake or other passive actuator can be locked whenever the stick is not at the neutral position in manual transmission mode (at or near symbol "N" in FIG. 4a), i.e. X-axis locked in any gear position. The brake can be unlocked when the shift lever is moved back into the horizontal channel of the manual pattern (it would stay locked in automatic or sequential mode). The Y-axis actuator can be fully active in this embodiment, such as a DC motor, and can be used to generate force sensations on the lever 12 when it is moved, e.g. to generate hills, damping and springs that define the way the shifting feels to the user. The active Y-axis actuator can also be used to prevent the user from shifting the lever into areas intended to be blocked (such as zones A, B, C, and D as shown in FIG. 4a) when the lever 12 is moved within the horizontal channel between vertical channels of the manual transmission pattern.

One advantage of the use of passive actuators such as brakes is that they have a significantly higher holding force than an active actuator of comparable size, and thus can provide a very strong opposing or barrier force to the user without requiring great amounts of power. This allows the blocked areas of the shifting pattern to be more easily implemented with lower cost and smaller sized components. A disadvantage of brakes is that when they are active and resisting user force, they restrict motion in both directions of that degree of freedom, causing sensing of motion away from a barrier to be more complex. One way to sense motion with passive actuators is described in U.S. Pat. No. 5,767,839, incorporated herein by reference in its entirety.

Active Y-Axis and Passive X-Axis Implementation with Gate

This implementation is similar to the implementation described above in which an active actuator is used to output force sensations for Y-axis motion of the shift lever and a passive actuator such as a brake is used for the X-axis motion. This implementation adds a mechanical gate, which can be similar to any of the gate embodiments described above. The gate eliminates the need for the Y-axis actuator to output a barrier force on the shift lever when the lever is in the center channel and moves into a blocked area. Thus, the Y-axis actuator can be made smaller since it only outputs force sensations to enhance the motion and selection of the shift lever, such as hills, detents, damping, and springs.

Active/Passive Y-Axis and Passive X-Axis Implementation

This implementation can use a combination active actuator and passive actuator for the Y-axis actuator. The active actuator portion, such as a motor, can be used for the active haptic effects such as hills, detents, and springs. The passive actuator portion, such as a brake, can be used to provide barrier forces to prevent motion out of the neutral zone between gear positions. The X-axis actuator is a passive actuator and preferably has spring centering so that the shift lever always is biased to return to the neutral position (which is at the center of the pattern in FIG. 4a). In the standard manual transmission pattern of FIG. 4a, since there is no mechanical gate in this implementation, the X-axis passive actuator locks whenever the lever is moved in a Y-direction outside of the neutral position to keep the lever within a vertical channel. Similarly, the Y-axis passive actuator locks whenever the shift lever moves in a X-direction outside of one of the three shift columns (in manual mode) to prevent Y-axis motion into a blocked area. Preferably, extremely fast response of the actuators is provided when the shift lever is moved into or out of the center horizontal channel.

Some embodiments can use the passive actuators to output passive haptic effects on the lever as well, such as damping, brake jolts, passive detents, etc. In some embodiments, a mechanical gate can be added to ease the stiffness and latency requirements of this embodiment.

Combinations of active actuators and passive actuators can be implemented in a variety of ways. For example, if a mechanism has two degrees of freedom, an active actuator can be coupled to the linkages of one degree of freedom to provide active forces in that degree of freedom, while a passive actuator can be coupled to the linkages of the other degree of freedom to provide passive forces in that degree of freedom. If both active and passive forces are desired for a particular degree of freedom, then both active and passive actuators can be coupled to the appropriate linkages or components. For example, an active actuator can be rigidly coupled to one side of a moving linkage, while a passive actuator can be coupled to the other side of the linkage, where the passive actuator can be coupled by a member having a small amount of flex to allow proper alignment and a small amount of play to allow sensing of motion when the brakes are locked. Either or both of the actuators can then be energized to provide forces in that degree of freedom.

Active/Passive Y-axis and Active/Passive X-Axis Implementation

A combination of active actuator and passive actuator is used to output forces in both X-axis and Y-axis in this embodiment. The active actuator portions, such as motors, can be used for active haptic sensations, such as hills and springs, and the passive actuator portions, such as brakes, can be used to prevent motion of the shift lever outside of the desired pattern. The X-axis actuator can use the brake for preventing X-axis motion when the device is in automatic or sequential mode (or other similar mode), and the active motor can provide spring centering.

If this implementation is used without a mechanical gate, the X-axis brake can lock whenever the shift lever moved in a Y-direction within one of the vertical channels of the shift pattern (and not in the center horizontal channel), thus preventing X-axis motion in that channel. The Y-axis brake can lock whenever the shift lever moves in an X-direction outside of one of the vertical shift channels (in manual mode). Similar to the above-described embodiments, a mechanical gate can be also be used to provide increased stiffness and stronger barrier forces.

Fully Passive Implementation

This implementation uses only passive actuators, such as brakes, for X-axis and Y-axis motion of the shift lever. The brakes are alternately applied to the shift lever to prevent the shift lever from moving outside the selected shift pattern. Mechanical springs can be used to provide a spring centering force on the shift lever, causing it to be biased towards the center neutral position N. When in automatic, sequential, or similar one-channel mode, the X-axis brake prevents the user from moving the shift lever outside the center channel. When in manual mode, the Y-axis brake prevents the user from moving the shift lever from the center horizontal channel into the areas desired to be blocked (e.g. areas A, B, C, or D). When the shift lever is moved to a gear position in manual mode, the brakes can lock the lever in place to prevent the spring bias from moving the stick. The brakes can also produce haptic sensations, such as detents, damping, etc. to simulate the lever falling into gear positions and to inform the user of the current selection. In automatic mode and other modes as desired, a light resistance can be applied to the shift lever by the brakes to negate the spring force provided by the mechanical springs. Alternatively, in automatic mode the brakes can lock in each gear, and a button or other control on the shift lever can be depressed by the user to release the brakes and allow the shift lever to be moved to another gear position. In some embodiments, the brakes can be released based purely on position information of the shift lever, e.g. when the lever is moved away from one gear toward another gear (the motion can be sensed when the brakes are locked using, for example, a small amount of play in the lever as described in U.S. Pat. No. 5,767,839).

It should be noted that the functions of the haptic shifter devices described above can also be used for simulated vehicles. For example, a joystick device for inputting directional signals or data to an electronic device, computer, or video game device can include the modes and haptic feedback described herein. For example, a joystick having these shift patterns can be used to simulate a stickshift or shift lever to change simulated gears in a simulated vehicle in computer simulation, where a view of a driver is simulated by displaying images on a display device of the computer system. Other interface devices, such as a rotatable knob having lateral directional motion, a mouse or trackball, or other moveable manipulandum ca be used with the movement patterns and modes described herein.

Figure 7:
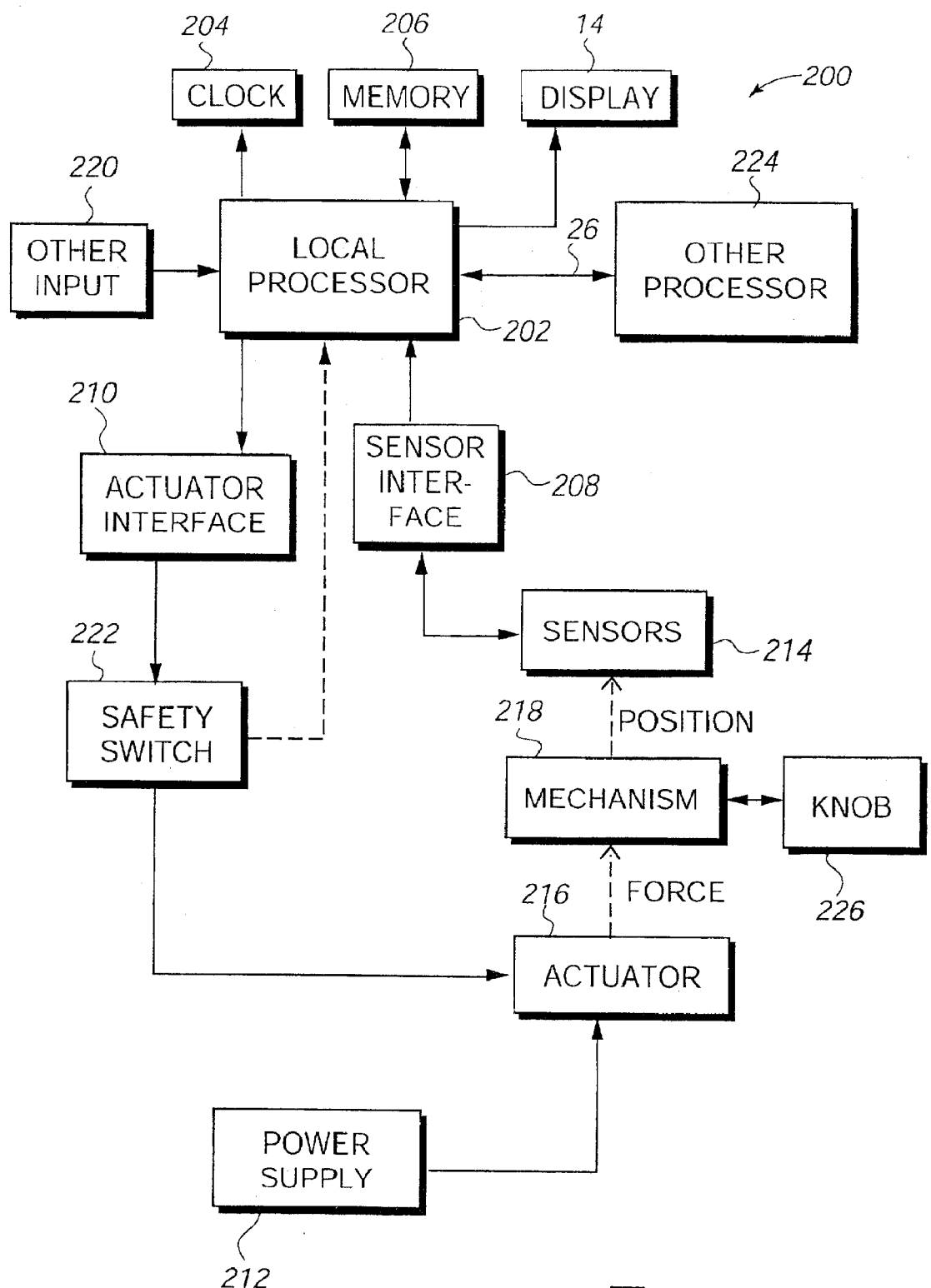
FIG. 7 is a block diagram illustrating a haptic feedback system suitable for use in the present invention.

FIG. 7 is a block diagram illustrating an electromechanical system 200 suitable for use with the haptic shifter device of the present invention. A haptic feedback system including many similar components is described in detail in U.S. Pat. No. 5,734,373, which is incorporated by reference herein in its entirety.

In one embodiment, the controlled device includes an electronic portion having a local processor 202, local clock 204, local memory 206, sensor interface 208, and actuator interface 210.

Local processor 202 is considered "local" to the haptic shifter device 10, where "local" herein refers to processor 202 being a separate processor from any other processors, and refers to processor 202 being dedicated to haptic feedback and/or sensor I/O for the lever 12. The processor 202 can read sensor signals from the sensors or sensor interface and determine the gear of the vehicle that has been selected by the shift lever 12, and can then provide appropriate data to a control system or other processor to mechanically cause the gear of the vehicle to be shifted. For example, the control system can control other actuators to move the appropriate mechanical parts to shift transmission gears, as is well known to those skilled in the art of shift-by-wire. Alternatively, processor 202 can simply pass position data to a control system which determines from the data the proper vehicle gear and controls the shift to that gear. In yet other embodiments, processor 202 can control the shifting process in the vehicle as well.

In some embodiments, processor 202 can also calculate appropriate forces from the sensor signals, time signals, and force processes selected in accordance with a host command, and output appropriate control signals to the actuators to output haptic sensations on the shift lever. In other embodiments, other processors can determine and control forces. Processor 202 can be a microprocessor (one microprocessor chip, multiple processors, co-processor, digital signal processor (DSP), etc.). Or, the processor 202 can be fixed digital logic, an ASIC, state machines, or other type of processor.

A local clock 204 can be coupled to the processor 202 to provide timing data, and local memory 206, such as ROM and/or ROM, is preferably coupled to processor 202 to store instructions, temporary and other data, calibration parameters, adjustments to compensate for sensor variations, and/or the state of the device. A display 16 can be provided in some embodiments and coupled to local processor 202. Alternatively, a different processor or other controller can control output to the display 16.

Sensor interface 208 may optionally be included in to convert sensor signals provided by sensors 214 to signals that can be interpreted by the processor 202. For example, sensor interface 208 can receive signals from a digital sensor 214 such as an encoder and convert the signals into a digital binary number. An analog to digital converter (ADC) can also be used. Alternately, processor 202 can perform these interface functions. Actuator interface 210 can be optionally connected between the actuator(s) 216 and processor 202 to convert signals from processor 202 into signals appropriate to drive the actuators. Actuator interface 210 can include power amplifiers, switches, digital to analog controllers (DACs), and other components. In alternate embodiments, actuator interface 210 circuitry can be provided within processor 202 or in the actuator(s). A power supply 212 of any of various types (including car battery or alternator, in an automobile) can be coupled to the actuator and/or actuator interface 210 to provide electrical power for the actuators.

The mechanical portion of the system can include some or all of the components needed for the allowed motions of the shift lever 12, some examples of which are described above. Sensors 214 sense the position, motion, and/or other characteristics of lever 12 in one or more degrees of freedom and provide signals to processor 202 (or other processor) including information representative of those characteristics. A sensor 214 can be provided for each degree of freedom along which lever 12 can be moved, or, a single compound sensor can be used for multiple degrees of freedom. Examples of suitable sensors include the sensors 62 of FIG. 3b, optical encoders, analog sensors such as potentiometers, Hall effect magnetic sensors, optical sensors such as a lateral effect photo diodes, tachometers, accelerometers, etc. Furthermore, either absolute or relative sensors may be used.

Actuators 216 transmit forces to lever 12 in one or more directions, typically in rotary degrees of freedom in response to signals output by processor 202 or other electronic logic or device, i.e., it is "electronically-controlled." The actuators 216 produce electronically modulated forces which means that processor 202 or other electronic device controls the application of the forces. An actuator 216 can be provided for each degree of freedom. Actuators 216 can be active actuators, such as a linear current control motor, stepper motor, pneumatic/hydraulic active actuator, a torquer (motor with limited angular range), magneto-rheological brakes, voice coil actuator, etc. Passive actuators can also be used, including magnetic particle brakes, friction brakes, or pneumatic/hydraulic passive actuators, and generate a damping resistance or friction in a degree of motion. Embodiments using active and passive actuators are described in detail above.

Mechanism 218 is used to translate motion of lever 12 to a form that can be read by sensors 214, and to transmit forces from actuators 216 to lever 12. Some examples of mechanism 218 are described above. Also, a drive mechanism such as a belt drive, gear drive, or capstan drive mechanism can be used to provide mechanical advantage to the forces output by actuator 216 and/or to provide enhanced sensing resolution.

Other input devices 220 can be included to send input signals to processor 202. Such input devices can include buttons or other controls used to supplement the input from the panel to the controlled device. Also, dials, switches, voice recognition hardware (e.g. a microphone, with software implemented by processor 202), or other input mechanisms can also be included to provided input to processor 202 or to the actuators 216. A deadman switch can be included on or near the lever 12 to cause forces to cease outputting when the user is not contacting the lever as desired to prevent the lever from moving on its own when the user is not touching it, e.g. contact of a user's hand or digit (finger, thumb, etc.) with the lever can be detected using optical, resistive, inductive, force/pressure, or other sensors, pressure on the lever from the user can be detected using well known sensors, the user's hand weight on the lever can be detected, force on the lever can be measured using strain gauges, etc.

One or more other processors 224 can be included in some embodiments to communicate with local processor 202. Processors 202 and 224 are preferably coupled together by a bi-directional bus 226. Additional electronic components may also be included for communicating via standard protocols on bus 226. These components can be included in the device or another connected device. Bus 226 can be any of a variety of different communication busses. For example, a bi-directional serial or parallel bus, a wireless link, a network architecture (such as CANbus), or a uni-directional bus can be provided between processors 224 and 202.

Other processor 224 can be a separate microprocessor (or other type of processor, as described above for processor 202) in a different device or system that coordinates operations or functions with the controlled device. For example, other processor 224 can control the actual shifting of gears of a vehicle, as described above. In some embodiments, another processor 224 can be provided in a separate control subsystem in a vehicle, where the other processor 224 controls systems such as the temperature system in the car, or the position of mechanical components (car mirrors, seats, the transmission shift points or positions, etc.), or a central display device that displays information from various systems. Or, the other processor 224 can be a host processor or centralized controller for many systems including the controlled haptic shifter device and processor 202. The two (or more) processors 202 and 224 can exchange information as needed to facilitate control of various systems, output event notifications to the user, etc. For example, if other processor 224 has determined or found out that the vehicle is malfunctioning in some manner, the other processor 224 can communicate this information to the local processor 202, which then can output a particular indicator on display 16 or other display (and/or a haptic sensation on the shift lever) to warn the user. Or, if the lever 12 is allowed different modes of shifting or control, the other processor 224 can control some or all of the different modes.

In other embodiments, other processor 224 can be a host processor, for example, that commands the local processor 202 to output force sensations by sending host commands to the local processor. The host processor can be a single processor or be provided in a computer such as a personal computer, workstation, video game console, portable computer or other computing or display device, set top box, etc. The host processor can include random access memory (RAM), read only memory (ROM), input/output (I/O) circuitry, and other components of computers well-known to those skilled in the art. The host processor can implement a host application program with which a user interacts using lever 12 and/or other controls and peripherals. The host application program can be responsive to signals from lever 12. In some embodiments, the host application program can output force feedback commands to the local processor 202 and to the lever 12. In a host processor embodiment or other similar embodiment, processor 202 can be provided with software instructions to wait for commands or requests from the host processor, parse/decode the command or request, and handle/control input and output signals according to the command or request.

For example, in one force feedback embodiment, host processor 224 can provide low-level force commands over bus 26, which local processor 202 directly transmits to the actuators. In a different force feedback local control embodiment, host processor 224 provides high level supervisory commands to processor 202 over bus 226, and processor 202 manages low level force control loops to sensors and actuators in accordance with the high level commands and independently of the host processor 224. In the local control embodiment, the processor 202 can independently process sensor signals to determine appropriate output actuator signals by following the instructions of a "force process" that may be stored in local memory 206 and includes calculation instructions, formulas, force magnitudes (force profiles), and/or other data. The force process can command distinct force sensations on the lever 12, such as damping, springs, barriers, detents, vibrations, textures, jolts, etc. Some examples of such operation of local processor in force feedback applications is described in greater detail in U.S. Pat. No. 5,734,373.

In an alternate embodiment, no local processor 202 is included in the interface device, and a processor such as processor 224 controls and processes all signals to and from the components of the haptic shift device 10. Or, hardwired digital logic can perform any input/output functions to the shift device 10.

Force Sensations

A number of force sensations are now described which are suitable for use with the haptic shifter devices described herein.

Force effects output on the lever 12 can include springs, dampers, textures, vibrations, detents, jolts or pulses, textures, inertia, friction, obstructions (barriers), or dynamic force effects. Many of these effects are described in other applications, such as applications Ser. No. 09/783,936 and U.S. Pat. Nos. 5,734,373; 6,147,674; 6,154,201; and 6,128,006, all incorporated herein by reference in their entirety. The force sensations can be integrally implemented with the control functions performed by the lever 12. Some of the sensations (such as springs) can only be output using active actuators.

A basic force sensation is force detents that are output at particular predefined or regularly-spaced positions of the lever 12 to inform the user how much the lever has moved and/or to designate particular positions of the lever. The force detents can be simple jolt or bump forces output in commanded directions to indicate a detent's position or mark a particular position of the lever, or the detents can include forces that attract the lever to the particular position and/or resist movement of the lever away from that position. Force feedback "snap-to" detents can also be provided, where a small force biases the knob to the detent position when it is just outside the position. Some types of detents are described in U.S. Pat. Nos. 6,154,201 and 5,734,373.

Another type of force sensation that can be output on lever 12 is a spring force. The spring force can provide resistance to movement of the lever in either direction to simulate a physical spring between the lever and ground. This can be used, for example, to "snap back" the lever to its rest or center position after the user lets go of the lever. A damping force sensation can also be provided on lever 12 to slow down the motion of the lever based on the lever's velocity. Small-magnitude spring forces can also be used for detents or other features.

A "hill" force effect can be used in some embodiments. The hill force effect acts as an increasingly resistive force until the "peak" of the hill is reached, after which point the force assists the user to continue to move away from the peak. Such an effect can be used between gear selections of the shift lever, for example. Some examples of hill effects are described in pending application Ser. No. 09/783,936.

A barrier force effect is meant to convey to the user that the lever has reached a limit to its motion and physically blocks the shift lever, either partially or totally, from moving to the positions "behind" the barrier. One way to implement a barrier effect is to provide a simple spring force having a high magnitude or "stiffness." A spring of the prior art is typically modeled using a relationship such as F=kx, where the resistive force output is linearly proportional to the distance that the knob is moved into the spring. Barriers having linear, exponential, or other types of profiles can be used; some barrier effects are described in copending U.S. application Ser. No. 09/783,936, filed Feb. 14, 2001. Other types of barrier effects can also be implemented.

Other force sensations can be output to inform the user of ends of travel for the lever 12. For example, a jolt force can be output that is stronger in magnitude than normal detents, which informs the user that the end of a value range or other range has been reached or will soon be reached.

Any of these force sensations can be combined to provide multiple simultaneous force effects.

While this invention has been described in terms of several preferred embodiments, there are alterations, modifications, and permutations thereof which fall within the scope of this invention. It should also be noted that the embodiments described above can be combined in various ways in a particular implementation or embodiment. Furthermore, certain terminology has been used for the purposes of descriptive clarity, and not to limit the present invention. It is therefore intended that the following appended claims include such alterations, modifications, and permutations as fall within the true spirit and scope of the present invention.

What is claimed is:

1. An apparatus, comprising:
   a manipulandum;
   a sensor configured to detect a motion of the manipulandum and output a sensor signal associated with the motion of the manipulandum;
   an actuator coupled to the manipulandum and configured to output a haptic effect associated with the sensor signal, the haptic effect substantially constraining the manipulandum to be moveable in a predetermined pattern; and
   a processor operable to receive the sensor signal from the sensor and cause a transmission ratio of a vehicle to be changed.

2. The apparatus of claims 1, wherein the manipulandum comprises a transmission shift lever.

3. The apparatus of claim 1, wherein the actuator includes at least one of an active actuator and a resistive actuator.

4. The method of claim 1, wherein the haptic effect includes a barrier force.

5. The apparatus of claim 4, wherein the haptic effect further imparts a haptic sensation on the manipulandum.

6. The apparatus of claim 5, wherein the haptic sensation includes at least one of a detent sensation, a hill sensation, a spring sensation, a jolt sensation, a damping sensation, a vibration sensation, and a texture sensation.

7. The apparatus of claim 5, wherein the actuator is a first actuator and further comprising a second actuator, the first actuator configured to output the barrier force, and the second actuator configured to impart the haptic sensation.

8. The apparatus of claim 7 wherein the first actuator includes a resistive actuator, and the second actuator includes an active actuator.

9. The apparatus of claim 1 wherein the manipulandum is coupled to a five-member closed-loop gimbal mechanism and moveable in two degrees of freedom.

10. The apparatus of claim 1 wherein the processor is further operable to output an actuator signal to the actuator, the actuator signal causing the actuator to output the haptic effect.

11. The apparatus of claim 10 wherein the processor is further operable to receive a selection associated with one of a plurality of shifting modes from a mode selector, and control the actuator such that the manipulandum is substantially constrained to move in a pattern corresponding with the selected shifting mode.

12. The apparatus of claim 10 further comprising a display device in communication with the processor, the processor operable to cause the predetermined pattern to display on the display device.

13. The apparatus of claim 1 wherein the vehicle includes one of an automobile, a truck, a military vehicle, an industrial vehicle, an underwater vehicle, a boat, an aircraft, and a space vehicle.

14. The apparatus of claim 13 wherein the manipulandum is included in a remote control that remotely controls the vehicle.

15. A method, comprising:
receiving a sensor signal associated with a motion of a manipulandum;
outputting an actuator signal to an actuator coupled to the manipulandum, the actuator signal configured to cause the actuator to output a haptic effect associated with the sensor signal, the haptic effect substantially constraining the manipulandum to be moveable in a predetermined pattern; and
causing a transmission ratio of a vehicle to be changed.

16. The method of claim 15 further comprising causing the predetermined pattern to be displayed on a display device.

17. The method of claim 15 further comprising receiving a selection associated with one of a plurality of shifting modes, and controlling the actuator such that the manipulandum is substantially constrained to move in a pattern corresponding with the selected shifting mode.

18. The method of claim 15 further comprising imparting a haptic sensation associated with a position of the manipulandum within the predetermined pattern.

19. The method of claim 18 wherein the haptic sensation includes at least one of a detent sensation, a barrier sensation, a hill sensation, a spring sensation, a jolt sensation, a damping sensation, a vibration sensation, and a texture sensation.

20. A computer-readable medium storing instructions to cause a processor to:
receive a sensor signal associated with a motion of a manipulandum;
output an actuator signal an actuator coupled to the manipulandum, the actuator signal configured to cause the actuator to output a haptic effect associated with the sensor signal, the haptic effect substantially constraining the manipulandum to be moveable in a predetermined pattern; and
cause a transmission ratio of a vehicle to be changed.

21. The computer-readable medium of claim 20 further comprising instructions to cause the predetermined pattern to be displayed.

22. The computer-readable medium of claim 20 further comprising further comprising instructions to receive a selection associated with one of a plurality of shifting modes, and control the actuator such that the manipulandum is substantially constrained to move in a pattern corresponding with the selected shifting mode.

23. The computer-readable medium of claim 20 further comprising instructions to impart a haptic sensation associated with a position of the manipulandum within the predetermined pattern.

24. The computer-readable medium of claim 23 wherein the haptic sensation includes at least one of a detent sensation, a hill sensation, a spring sensation, a jolt sensation, a damping sensation, a vibration sensation, and a texture sensation.

25. An apparatus, comprising:
a manipulandum;
a sensor configured to detect a motion of the manipulandum and output a sensor signal associated with the motion of the manipulandum; and
an actuator coupled to the manipulandum and configured to output a haptic effect associated with the sensor signal, the haptic effect substantially constraining the manipulandum to be moveable in a predetermined pattern based at least in part on a pre-determined force profile.

26. The apparatus of claim 25, wherein the haptic effect further imparts a haptic sensation on the manipulandum.

27. The apparatus of claim 26, wherein the haptic sensation includes at least one of a detent sensation, a hill sensation, a spring sensation, a jolt sensation, a damping sensation, a vibration sensation, and a texture sensation.

28. The apparatus of claim 25 wherein the manipulandum is coupled to a five-member closed-loop gimbal mechanism and moveable in two degrees of freedom.

29. The apparatus of claim 25 further comprising a processor in communication with the sensor and the actuator, the processor operable to receive the sensor signal from the sensor and output an actuator signal to the actuator, the actuator signal causing the actuator to output the haptic effect.

30. The apparatus of claim 29 wherein the processor is further operable to receive a selection associated with one of a plurality of shifting modes from a mode selector and control the actuator such that the manipulandum is substantially constrained to move in a pattern corresponding with the selected shifting mode.

31. The apparatus of claim 29 further comprising a display device in communication with the processor, the processor operable to cause the predetermined pattern to display on the display device.

32. The apparatus of claim 25 wherein the processor is further operable to cause a transmission ratio of a vehicle to be changed.

33. The apparatus of claim 32 wherein the vehicle includes one of an automobile, a truck, a military vehicle, an industrial vehicle, an underwater vehicle, a boat, an aircraft, and a space vehicle.

34. The apparatus of claim 32 wherein the manipulandum is included in a remote control that remotely controls the vehicle.

35. A computer-readable medium storing instructions to cause a processor to:

receive a sensor signal associated with a motion of a manipulandum;

output an actuator signal an actuator coupled to the manipulandum, the actuator signal configured to cause the actuator to output a haptic effect associated with the sensor signal, the haptic effect substantially constraining the manipulandum to be moveable in a predetermined pattern based at least in part on a pre-determined force profile.

36. The computer-readable medium of claim 35 further comprising instructions to cause the predetermined pattern to be displayed.

37. The computer-readable medium of claim 35 further comprising further comprising instructions to receive a selection associated with one of a plurality of shifting modes, and control the actuator such that the manipulandum is substantially constrained to move in a pattern corresponding with the selected shifting mode.

38. The computer-readable medium of claim 35 further comprising instructions to impart a haptic sensation associated with a position of the manipulandum within the predetermined pattern.

39. The computer-readable medium of claim 38 wherein the haptic sensation includes at least one of a detent sensation, a hill sensation, a spring sensation, a jolt sensation, a damping sensation, a vibration sensation, and a texture sensation.

40. The computer-readable medium of claim 35 further comprising instructions to cause a transmission ratio of a vehicle to be changed.

* * * * *

UNITED STATES PATENT AND TRADEMARK OFFICE
CERTIFICATE OF CORRECTION

PATENT NO. : 6,904,823 B2
DATED : June 14, 2005
INVENTOR(S) : Michael D. Levin and Steven P. Vassallo It is certified that error appears in the above-identified patent and that said Letters Patent is hereby corrected as shown below:

Title page,
Item [75], References Cited, U.S. PATENT DOCUMENTS,
"3,902,687 A    9/1975    Hightower" should read -- 3,902,687 A    6/1973    Hightower --.
"4,160,508 A    7/1979    Salsbury, Jr." should read -- 4,160,508 A    7/1979    Salisbury, Jr. --.

Column 5,
Line 26, the word "te" should read -- the --.

Column 14,
Line 25, the word "ca" should read -- can --.
Line 67, the word "ROM" should read -- RAM --.

Signed and Sealed this

Twenty-seventh Day of September, 2005

JON W. DUDAS
*Director of the United States Patent and Trademark Office*